United States Patent
Wang et al.

(10) Patent No.: US 11,190,797 B2
(45) Date of Patent: Nov. 30, 2021

(54) CONSTRAINTS ON DECODER-SIDE MOTION VECTOR REFINEMENT BASED ON WEIGHTS FOR BI-PREDICTED PREDICTION

(71) Applicant: QUALCOMM Incorporated, San Diego, CA (US)

(72) Inventors: Hongtao Wang, San Diego, CA (US); Wei-Jung Chien, San Diego, CA (US); Marta Karczewicz, San Diego, CA (US); Han Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,520

(22) Filed: Feb. 27, 2020

(65) Prior Publication Data

US 2020/0280736 A1    Sep. 3, 2020

Related U.S. Application Data

(60) Provisional application No. 62/812,828, filed on Mar. 1, 2019.

(51) Int. Cl.
*H04N 19/577* (2014.01)
*H04N 19/176* (2014.01)
*H04N 19/52* (2014.01)

(52) U.S. Cl.
CPC ......... *H04N 19/577* (2014.11); *H04N 19/176* (2014.11); *H04N 19/52* (2014.11)

(58) Field of Classification Search
CPC .... H04N 19/577; H04N 19/51; H04N 19/513; H04N 19/517; H04N 19/52; H04N 19/521
See application file for complete search history.

(56) References Cited

U.S. PATENT DOCUMENTS

2018/0359483 A1    12/2018   Chen et al.
2019/0230350 A1*    7/2019   Chen .................... H04N 19/573
(Continued)

FOREIGN PATENT DOCUMENTS

WO    WO-2019234669 A1 *  12/2019  ........... H04N 19/186
WO    WO-2020008343 A1 *   1/2020  ............. H04N 19/56

OTHER PUBLICATIONS

Chen C.C., et al., CE4-Related: Reduction of Interactions Between Hi-Prediction Coding Tools, 14. JVET Meeting, Mar. 19, 2019-Mar. 27, 2019, Geneva, CH (The Joint Video Exploration Team of ISO/IEC JTC1/SC29/WG11 and ITU-T SG.16) No. JVET-N0086, Mar. 19, 2019 (Mar. 19, 2019), XP030203602, 5 pages, Retrieved from the Internet: URL: http://phenix.int-evry.fr/jvet/doc_end_user/documents/14_Geneva/wg11/JVET-N0086-v3.zip. JVET-N0086-v1.docx. [retrieved on Mar. 19, 2019] abstract paragraph [8002].

(Continued)

*Primary Examiner* — Jayanti K Patel
*Assistant Examiner* — Christopher Kingsbury Glover
(74) *Attorney, Agent, or Firm* — Qualcomm Incorporated

(57) ABSTRACT

A video coder may be configured to determine to use a decoder side motion vector refinement process, including bi-lateral template matching, based on whether or not weights used for bi-predicted prediction are equal or not. In one example, decoder side motion vector refinement may be disabled when weights used for bi-predicted prediction are not equal.

26 Claims, 16 Drawing Sheets

(56) References Cited

U.S. PATENT DOCUMENTS

| | | | | |
|---|---|---|---|---|
| 2020/0228815 | A1* | 7/2020 | Xu | H04N 19/105 |
| 2020/0314445 | A1* | 10/2020 | Park | H04N 19/577 |
| 2020/0336749 | A1* | 10/2020 | Li | H04N 19/573 |
| 2021/0051339 | A1* | 2/2021 | Liu | H04N 19/52 |

OTHER PUBLICATIONS

Chen (Hikvision) F., et al., "Non-CE9: Modified Enabling Condition for DMVR and BDOF," 14. JVET Meeting, Mar. 19, 2019-Mar. 27, 2019, Geneva, CH (The Joint Video Exploration Team of ISO/IEC JTC1/SC29/WG11 and ITU-T SG.16), No. JVET-N0162, Mar. 13, 2019 (Mar. 13, 2019), XP030282868, 4 pages, Retrieved from the Internet: URL: http://phenix.int-evry.fr/jvet/doc_end_user/documents/14_Geneva/wg11/JVET-N0162-v1.zip. JVET-N0162-v1.docx. [retrieved on Mar. 13, 2019] abstract paragraph [0002].

Chen J., et al., "Algorithm Description for Versatile Video Coding and Test Model 4 (VTM 4)," 125. MPEG Meeting, Jan. 14, 2019-Jan. 18, 2019; Marrakech, MA (Motion Picture Expert Group or ISO/IEC JTC1/SC29/WG11), No. m46628, Feb. 16, 2019 (Feb. 16, 2019), XP030215566, 60 pages, Retrieved from the Internet: URL: http://phenix.int-evry.fr/mpeg/doc_end_user/documents/125_Marrakech/wg11/m46628-JVET-M1002-v1-JVET-M1002-v1.zip. JVET-M1002-v1.docx, [retrieved on Feb. 16, 2019] paragraphs [3.4.7], [3 4.9].

Chujoh T., et al., "Non-CE9: On Conditions for DMVR and BDOF," 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0146, Mar. 26, 2019 (Mar. 26, 2019), XP030204976, 5 pages, Retrieved from the Internet: URL: http://phenix.int-evry.fr/jvet/doc_end_user/documents/14_Geneva/wg11/JVET-N0146-v4.zip. JVET-N0146-v1.docx. [retrieved on Mar. 26, 2019] abstract paragraph [0001].

Esenlik (Huawei) S., "BoG Report on CE9 Related Contributions," 14. JVET Meeting, Mar. 19, 2019-Mar. 27, 2019, Geneva, (The Joint Video Exploration Team of ISO/IEC JTC1/SC29/WG11 and ITU-T SG.16) No. JVET-N0815, Mar. 23, 2019 (Mar. 23, 2019), XP030204731, 19 pages, Retrieved from the Internet: URL: http://phenix.int-evry.fr/jvet/doc_end_user/documents/14_Geneva/wg11/JVET-N0815-v2.zip. JVET-N0815-v2.docx. [retrieved on Mar. 23, 2019] paragraph [0003].

Hsu C.W., et al., "Description of SDR Video Coding Technology Proposal by MediaTek," 10. JVET Meeting, Apr. 10, 2018-Apr. 20, 2018, San Diego, (The Joint Video Exploration Team of ISO/IEC JTC1/SC29/WG11 and ITU-TSG.16 ), URL: http://phenix.int-evry.fr/jvet/,,No. JVET-J0018, Apr. 3, 2018 (Apr. 3, 2018), XP030151179, 64 pages, sections 2.4.1-2.4.1.3 with figures 5-8.

ISR/WO—International Search Report and Written Opinion—PCT/US2020/020392—ISA/EPO—dated Jul. 9, 2020.

Liu (Bytedance) H., et al., "CE9-related: Disabling DMVR and BDOF when Underlying Assumptions are False," 14. JVET Meeting, Mar. 19, 2019-Mar. 27, 2019, Geneva, CH (The Joint Video Exploration Team of ISO/IEC JTC1/SC29/WG11 and ITU-T SG.16), No. JVET-N0440, Mar. 19, 2019 (Mar. 19, 2019), XP030283732, 4 pages, Retrieved from the Internet: URL: http://phenix.int-evry.fr/jvet/doc_end_user/documents/14_Geneva/wg11/JVET-N0440-v2.zip. JVET-N0440 r1 docx, [retrieved on 2819-83-19] abstract paragraphs [0001], [0002].

Park (LGE) N., et al., "Non-CE9: Conditions Fix for DMVR and BDOF," 14. JVET Meeting, Mar. 19, 2019-Mar. 27, 2019, Geneva, CH (The Joint Video Exploration Team of ISO/IEC JTC1/SC29/WG11 and ITU-T SG.16) No. JVET-N0442, Mar. 13, 2019 (Mar. 13, 2019), XP030203078, 4 pages, Retrieved from the Internet: URL: http://phenix.int-evry.fr/jvet/doc_end_user/documents/14_Geneva/wg11/JVET-N0442-v1.zip. JVET-N0442.docx. [retrieved on Mar. 13, 2019] abstract paragraph [0002].

Partial International Search Report—PCT/US2020/020392—ISA/EPO—dated May 13, 2020.

Su Y-C., et al., "CE4.4.1: Generalized bi-Prediction for Inter Coding," 123. MPEG Meeting, Jul. 16, 2018-Jul. 20, 2018, Ljubljana, SI (Motion Picture Expert Group or ISO/IEC JTC1/SC29/WG11), No. m43177, Jul. 3, 2018 (Jul. 3, 2018), XP030195825, 4 pages, Retrieved from the Internet: URL: http://phenix.int-evry.fr/mpeg/doc_end_user/documents/123_Ljubljanafwg11/m43I77-JVET-K0248-v1-JVET-K0248-v1 zip. JVET-K0248-v1 .docx, [retrieved on Jul. 3, 2018] abstract.

Yu (Ericsson) R., et al., "Non-CE9: On DMVR and GBI," 14. JVET Meeting, Mar. 19, 2019-Mar. 27, 2019, Geneva, CH (The Joint Video Exploration Team of ISO/IEC JTC1/SC29/WG11 and ITU-T SG.16), No. JVET-N0153, Mar. 21, 2019 (Mar. 21, 2019), XP030284074, 3 pages, Retrieved from the Internet: URL: http://phenix.int-evry.fr/jvet/doc_end_user/documents/14_Geneva/wg11/JVET-N0153-v2.zip. JVET-N8153 vl.docx. [retrieved on Mar. 21, 2019] paragraphs [8001], [0082] abstract.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bossen: "Guidelines for VVC Reference Software Development", Joint Video Experts Team (JVEI) of ITU-T SG16 WP3 and ISO/IEC JTC1/SC29/WG11, 14th Meeting: Geneva, CH, Mar. 19-27, 2019, JVET-N1003, pp. 1-8.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V5, 287 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.

Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting: Jul. 13, 2017-Jul. 21, 2017, Torino, Aug. 19, 2017 (Aug. 19, 2017), 51 Pages, XP030150980, p. i-iv, Retrieved from the Internet: URL: http://phenix.int-evry.fr/jvet/doc_end_user/documents/7_Torino/wg11/JVET-G0001-v1.zip, p. 20, Paragraph 2.3 7-p. 23, Paragraph 2.3.7.6, p. 17, Paragraph 2.3.5-p. 18, section 2.

Chen X., et al., "CE 4: Merge Offset Extension (Test 4.4.8)", Joint Video Experts Team (JVET) of ITU-T SG 16 WP 3 and ISO/IEC JTC 1/SC 29/WG 11, JVET-L0176, HiSilicon Technologies Co., Ltd, Oct. 3-12, 2018, pp. 1-6.

Ergen S., "ZigBee/IEEE 802.15.4 Summary", Sep. 10, 2004, 37 Pages.

Huang: "CE9-Related: Disabling DMVR for Non Equal Weight BPWA", Joint Video Experts Team (JVET) of ITU-T SG16 WP3 and ISO/IEC JTC1/SC29/WG11, 14th Meeting: Geneva, CH, Mar. 19-27, 2019, JVET-N0262, pp. 1-2.

IEEE Std 802.11 ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Jeong S., et al., "CE4 Ultimate Motion Vector Expression (Test 4.5.4)", Joint Video Experts Team (JVET) of ITU-T SG 16 WP 3 and ISO/IEC JTC 1/SC 29/WG 11, JVET-L0054-r2, Oct. 3-12, 2018, pp. 1-6.

Ohm J-R., et al., "MPEG-4 Advanced Video Coding", MPEG Doc#: N7314, Jul. 2005, 11 Pages.

Sethuraman S., et al., "Decoder Side MV Refinement/Derivation with CTB-level Concurrency and other Normative Complexity

(56) References Cited

OTHER PUBLICATIONS

Reduction Techniques", Joint Video Experts Team (JVET) of ITU-T SG 16 WP 3 and ISO/IEC JTC 1/SC 29/WG 11, JVET-K0041-v2, Jul. 10-18, 2018, 9 pages.

Su Y-C., et al., "CE4.4.1: Generalized Bi-Prediction for Inter Coding", 11th Meeting: Ljubljana, SI, Jul. 10-18, 2018, (The Joint Video Exploration Team of ISO/IEC JTC1/SC29/WG11 and ITU-T SG.16), No. JVET-K0248-V1, MediaTek Inc, pp. 1-4.

Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

Chen C., et al., "Generalized Bi-Prediction for Inter Coding," Joint Video Experts Team (JVET) of ITU-T SG 16 WP 3 and ISO/IEC JTC 1/SC 29/WG 11, JVET-C0047 r1, 3rd Meeting: Geneva, CH, May 26-Jun. 1, 2016, pp. 1-4.

\* cited by examiner

CONSTRAINTS ON DECODER-SIDE MOTION VECTOR REFINEMENT BASED ON WEIGHTS FOR BI-PREDICTED PREDICTION

This application claims the benefit of U.S. Provisional Application No. 62/812,828, filed Mar. 1, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for decoder-side motion vector refinement (DMVR). In particular, this disclosure describes techniques for determining when to apply a motion vector refinement process, such as bilateral template matching, to a block of video data encoded using bi-predicted prediction. In one example, a video coder may disable a motion vector refinement process for a bi-predicted block when the weights used for bi-predicted prediction are not equal. In a further example of the disclosure, a video coder may also disable the motion vector refinement process when a difference between predicted blocks identified by the motion vectors of the bi-prediction is less than a threshold. The techniques of this disclosure may be applied to extensions of any of the existing video codecs, be used with the developing VVC (Versatile Video Coding) standard, or be an efficient coding tool in any future video coding standards.

In one example, a method includes determining motion vectors for a current block of video data encoded using bi-predicted prediction, determining to use a motion vector refinement process on the motion vectors based on weights used for the bi-predicted prediction of the current block, and applying the motion vector refinement process on the motion vectors based on the determination to use the motion vector refinement process.

In another example, an apparatus configured to decode video data includes a memory configured to store a current block of video data, and one or more processors implemented in circuitry and in communication with the memory, the one or more processors are configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process.

In another example, an apparatus configured to decode video data includes means for determining motion vectors for a current block of video data encoded using bi-predicted prediction, means for determining to use a motion vector refinement process on the motion vectors based on weights used for the bi-predicted prediction of the current block, and means for applying the motion vector refinement process on the motion vectors based on the determination to use the motion vector refinement process.

In another example, this disclosure describes a non-transitory computer-readable storage medium storing instructions that, when executed, cause one or more processors configured to decode video data to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process.

The details of one or more examples are set forth in the accompanying drawings and the description below. Other features, objects, and advantages will be apparent from the description, drawings, and claims.

DETAILED DESCRIPTION

In general, this disclosure describes techniques for decoder-side motion vector refinement (DMVR). In particular, this disclosure describes techniques for determining when to apply a motion vector refinement process, such as bilateral template matching, to a block of video data encoded using bi-predicted prediction. In accordance with the techniques of this disclosure, a video coder may be configured to determine when to apply a motion vector refinement process without explicitly coding (e.g., encoding or decoding) syntax elements indicating whether not motion vector refinement is to be applied. In this way, a video coder may selectively apply motion vector refinement without increasing overhead signaling in the encoded video bitstream. In one example, a video coder (e.g., video encoder and/or video decoder) may disable a motion vector refinement process for a bi-predicted block when the weights used for bi-predicted prediction are not equal. In a further example of the disclosure, a video coder may also disable the motion vector refinement process when a difference between predicted blocks identified by the motion vectors of the bi-prediction is less than a threshold.

Figure 1:
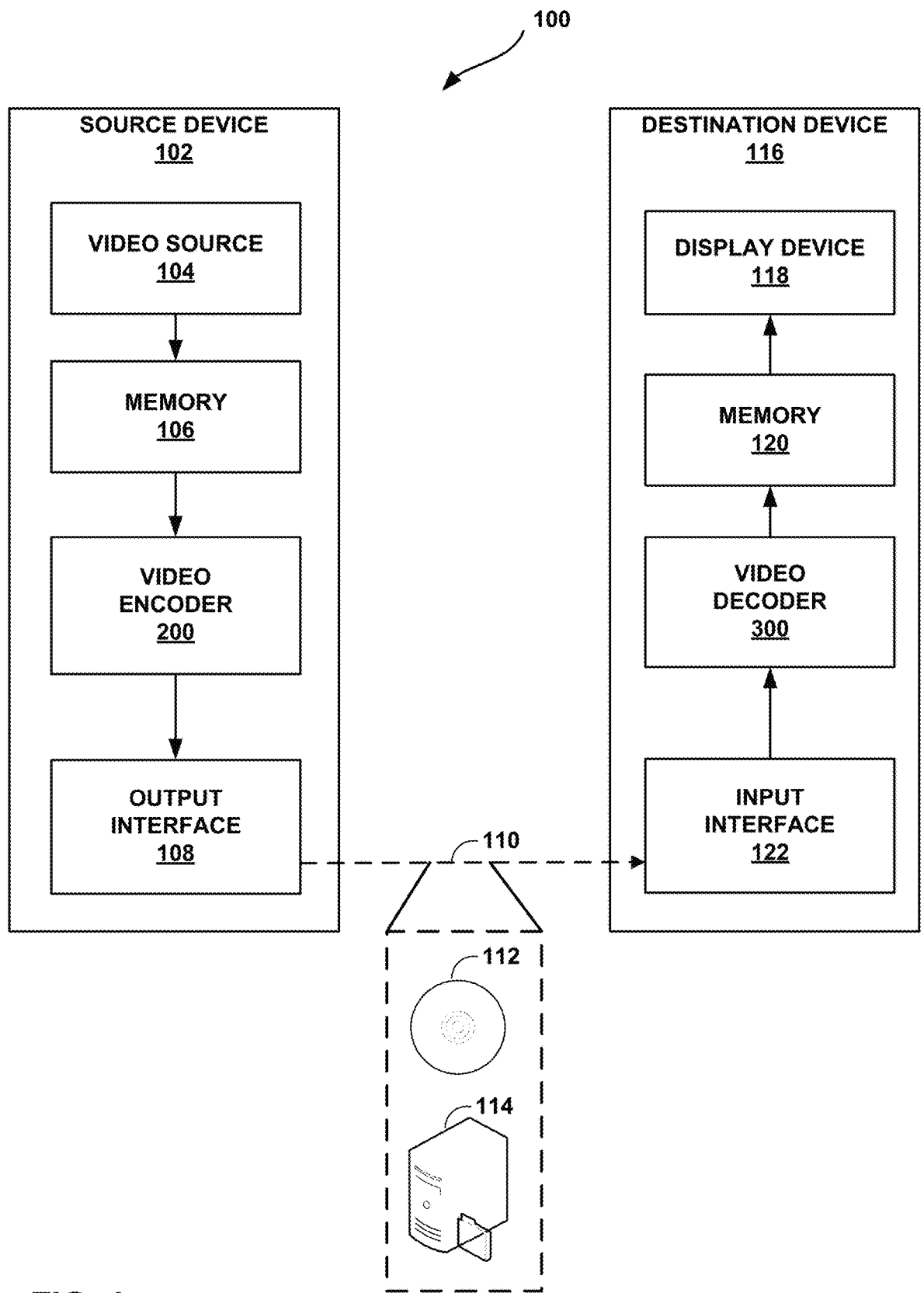
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure for DMVR. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data. As will be explained in more detail below, this disclosure describes techniques for determining when to apply a motion vector refinement process for DMVR, such as bilateral template matching, to a block of video data encoded using bi-predicted prediction. In one example, a video coder may disable a motion vector refinement process for a bi-predicted block when the weights used for bi-predicted prediction are not equal. In a further example of the disclosure, a video coder may also disable the motion vector refinement process when a difference between predicted blocks identified by the motion vectors of the bi-prediction is less than a threshold. The techniques of this disclosure may increase coding efficiency and/or simplify implementation of DMVR techniques.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder-side motion vector refinement. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for decoder-side motion vector refinement. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-M1001-v5 (hereinafter "VVC Draft 4). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
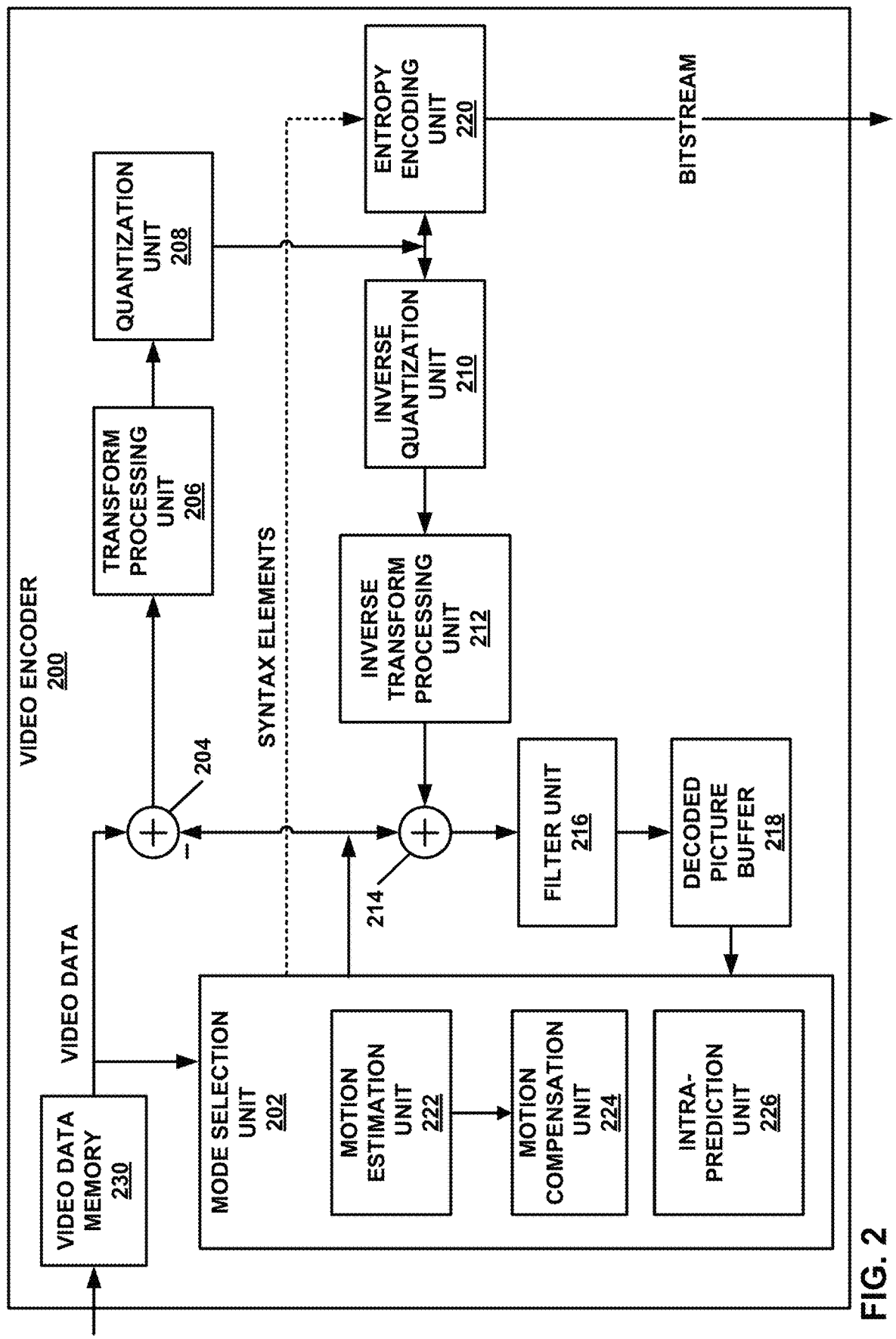
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction (bi-predicted prediction), motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure that will be described in more detail below, motion compensation unit 224 may be configured to encode blocks of video data using bi-predicted prediction. As mentioned above, bi-predicted prediction may use two motion vectors from two reference picture lists. In some examples, motion compensation unit 224 may also apply a motion vector refinement process (e.g., DMVR) to one or more of the motion vectors used in the bi-predicted prediction. Example DMVR techniques are discussed below, and may include one or more of merge motion vector refinement, merge offset extension, bilateral template matching, parametric sub-pel motion vector derivation, and bi-directional optical flow. This disclosure describes techniques for determining when to use DMVR techniques (e.g., bilateral template matching) when encoding a block of video data with bi-predicted prediction.

In one example of the disclosure, motion compensation unit 224 may be configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process. For example, when the weights used for the bi-predicted prediction of the current block are not equal, motion compensation unit 224 may determine to disable the motion vector refinement process. In other examples, motion compensation unit 224 may be configured to determine a difference between predicted blocks identified by the motion vectors, and determine to use the motion vector refinement process on the motion vectors based on weights used for the bi-predicted prediction of the current block and the determined difference between the predicted blocks identified by the motion vectors. For example, motion compensation unit 224 may be configured to determine to disable the motion vector refinement process in the case that the difference between the predicted blocks identified by the motion vectors is less than a threshold.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to determine a motion vector for a current block of video data, determine to use a motion vector refinement process on the motion vector based on weights used for bi-predicted prediction of the current block, and refine the motion vector based on the determination to use the motion vector refinement process.

Figure 3:
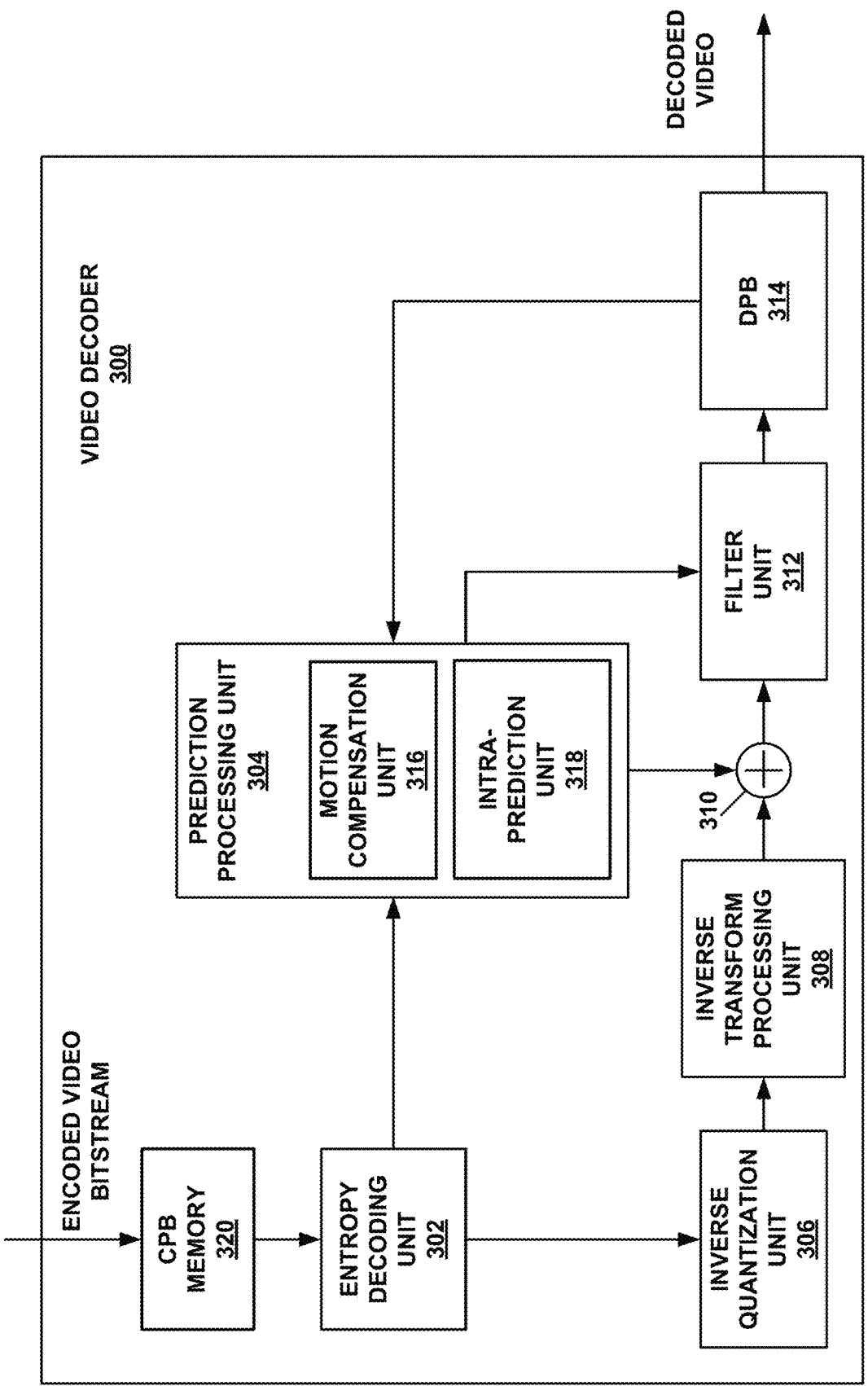
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

In accordance with the techniques of this disclosure that will be described in more detail below, motion compensation unit 316 may be configured to decode blocks of video data using bi-predicted prediction. As mentioned above, bi-predicted prediction may use two motion vectors from two reference picture lists. In some examples, motion compensation unit 316 may also apply a motion vector refinement process (e.g., DMVR) to one or more of the motion vectors used in the bi-predicted prediction. Example DMVR techniques are discussed below, and may include one or more of merge motion vector refinement, merge offset extension, bilateral template matching, parametric sub-pel motion vector derivation, and bi-directional optical flow. This disclosure describes techniques for determining when to use DMVR techniques (e.g., bilateral template matching) when decoding a block of video data with bi-predicted prediction.

In one example of the disclosure, motion compensation unit 316 may be configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process. For example, when the weights used for the bi-predicted prediction of the current block are not equal, motion compensation unit 316 may determine to disable the motion vector refinement process. In other examples, motion compensation unit 316 may be configured to determine a difference between predicted blocks identified by the motion vectors, and determine to use the motion vector refinement process on the motion vectors based on weights used for the bi-predicted prediction of the current block and the determined difference between the predicted blocks identified by the motion vectors. For example, motion compensation unit 316 may be configured to determine to disable the motion vector refinement process in the case that the difference between the predicted blocks identified by the motion vectors is less than a threshold.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process.

In the following sections, HEVC and JEM techniques and on-going work in Versatile Video Coding (VVC) related to this disclosure are described.

CU Structure and Motion Vector Prediction in HEVC

In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) can be the same size of a CTB, and as small as 8×8. Each coding unit is coded with one mode (e.g., inter prediction, intra prediction, etc.). When a CU is inter coded, video encoder 200 and video decoder 300 may further partition the CU into 2 or 4 prediction units (PUs) or just one PU when further partitioning does not apply. When two PUs are present in one CU, they can be half size rectangles or two rectangles that are ¼ or ¾ the size of the CU.

When the CU is inter coded, one set of motion information is present for each PU. In addition, each PU is coded with a unique inter-prediction mode to derive the set of motion information.

Motion Vector Prediction

In the HEVC standard, there are two inter prediction modes, named merge (skip is considered as a special case of merge without residual) and advanced motion vector prediction (AMVP) modes, respectively, for a prediction unit (PU). In either AMVP or merge mode, video encoder 200 and video decoder 300 may construct and maintain a motion vector (MV) candidate list of multiple motion vector predictors. Video encoder 200 and video decoder 300 may generate the motion vector(s), as well as reference indices in the merge mode, of the current PU by taking the motion information of one candidate from the MV candidate list.

In HEVC, the MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, video encoder 200 and video decoder 300 are configured to use the reference pictures for the prediction of the current blocks. In addition, video encoder 200 and video decoder 300 are configured to determine the motion vector associated with the merge index. However, under AMVP mode, for each potential prediction direction from either list 0 or list 1, video encoder 200 explicitly signals a reference index, together with an MV predictor (MVP) index to the MV candidate list, since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Spatial Neighboring Candidates

Figure 4B:
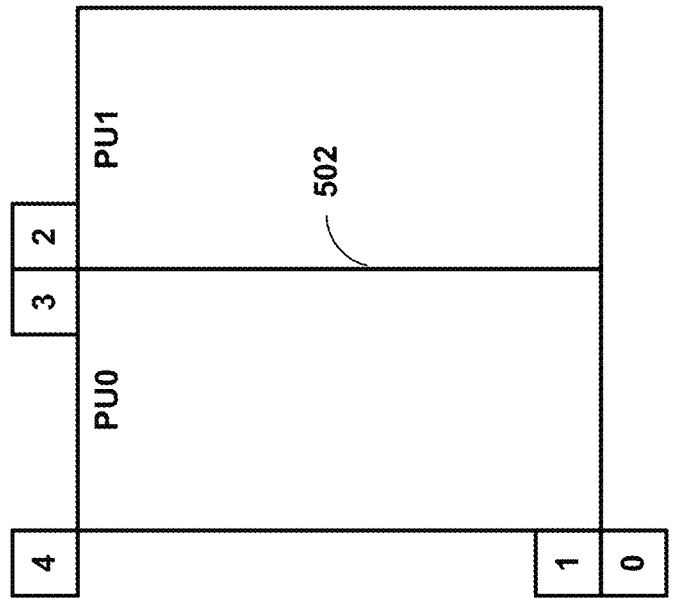
FIG. 4B is a conceptual diagram illustrating spatial neighboring motion vector candidates for advanced motion vector prediction (AMVP) mode.
Figure 4A:
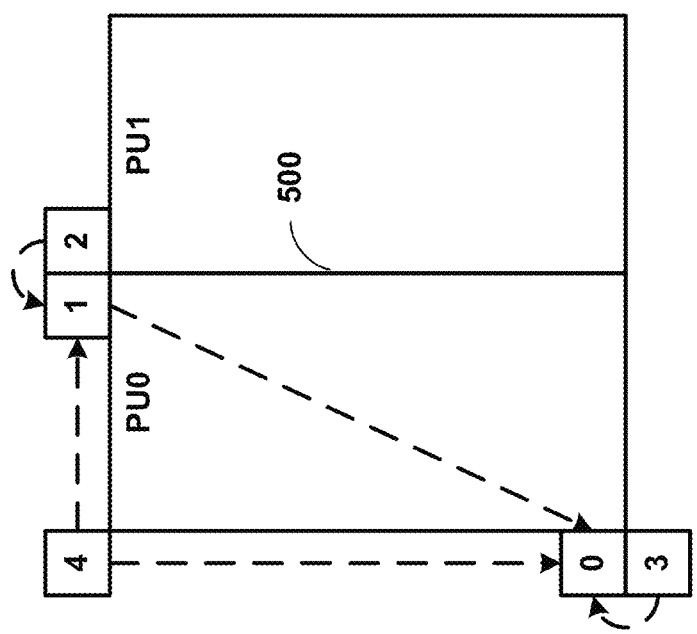
FIG. 4A is a conceptual diagram illustrating spatial neighboring motion vector candidates for merge mode.

In HEVC, video encoder 200 and video decoder 300 may derive spatial MV candidates from the neighboring blocks, as shown in FIG. 4A and FIG. 4B, for a specific PU ($PU_0$), although the techniques for generating the candidates from the blocks differ for merge and AMVP modes.

FIG. 4A is a conceptual diagram showing spatial neighboring candidates of block 500 for merge mode. FIG. 4B is a conceptual diagram showing spatial neighboring candidates of block 502 for AMVP mode. In merge mode, video encoder 200 and video decoder 300 may derive up to four spatial MV candidates in the order shown in FIG. 4A. The order is the following: a left block (0, A1), an above block (1, B1), an above-right block (2, B0), a below-left block (3, A0), and an above-left (4, B2) block.

In AMVP mode, video encoder 200 and video decoder 300 may divide the neighboring blocks into two groups: a left group including blocks 0 and 1, and an above group include blocks 2, 3, and 4, as shown in FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, video encoder 200 and video decoder 300 may scale the first available candidate to form the final candidate. Thus, the temporal distance differences can be compensated.

Temporal Motion Vector Prediction in HEVC

Temporal motion vector prediction in HEVC will now be discussed. Video encoder 200 and video decoder 300 may be configured to add a temporal motion vector predictor (TMVP) candidate, if enabled and available, into the MV candidate list after spatial motion vector candidates. The process of motion vector derivation for TMVP candidate is the same for both merge and AMVP modes. However, in HEVC, the target reference index for the TMVP candidate in the merge mode is set to 0.

Figure 5A:
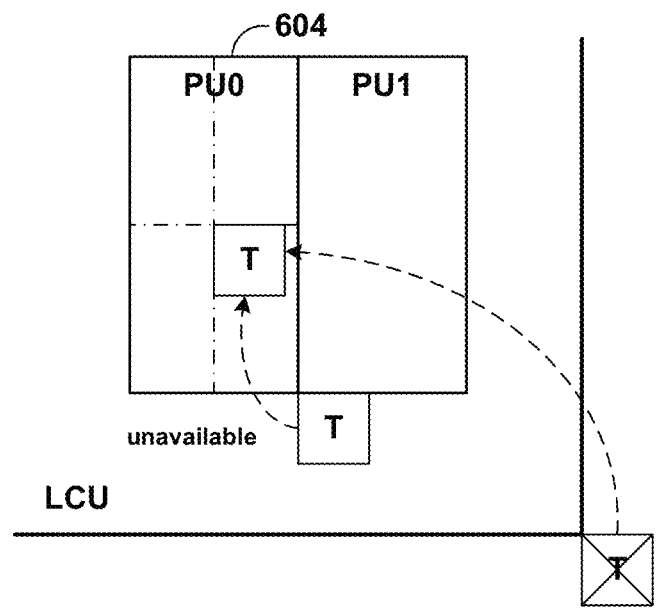
FIG. 5A is a conceptual diagram illustrating temporal motion vector candidates.
Figure 5B:
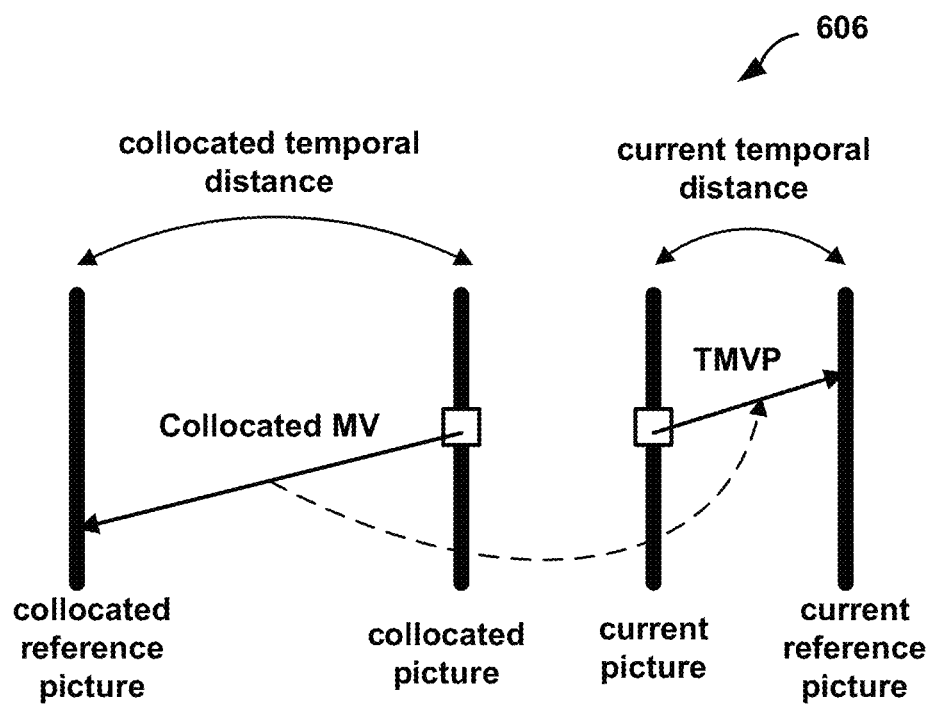
FIG. 5B is a conceptual diagram illustrating motion vector scaling.

FIG. 5A shows example TMVP candidates for block 604 (PU0) and FIG. 5B shows motion vector scaling process 606. The primary block location for TMVP candidate derivation is the bottom right block outside of the collocated PU. This candidate is shown in FIG. 5A as a block "T." The location of block T is used to compensate the bias to the above and left blocks used to generate spatial neighboring candidates. However, if that block is located outside of the current CTB row or motion information is not available, the block is substituted with a center block of the PU.

A motion vector for the TMVP candidate is derived from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 5B.

Merge Motion Vector Refinement

S. Jeong, et. al., "CE4 Ultimate Motion Vector Expression (Test 4.5.4)," Joint Video Experts Team (JVET) of ITU-T SG 16 WP 3 and ISO/IEC JTC 1/SC 29/WG 11, $12^{th}$ Meeting, Macao, CN, 3-12, October 2018, JVET-L0054, Merge Motion Vector Refinement (MMVR, a.k.a. Ultimate Motion Vector Expression, UMVE) presented techniques for refining motion vectors of Merge candidates based on a signaled motion vector difference. UMVE provides an alternative motion vector expression with simplified signaling, including starting point, motion magnitude, and motion direction. The merge motions can be refined using one of the depicted offsets in FIG. 6A and FIG. 6B on the cross-shape pattern centered at the location pointed to by unrefined merge motion vectors. In addition, the MV offset (e.g., the refined MV minus original MV) pointing to the reference picture in List L0 is scaled to the reference picture in List L1.

Figure 6A:
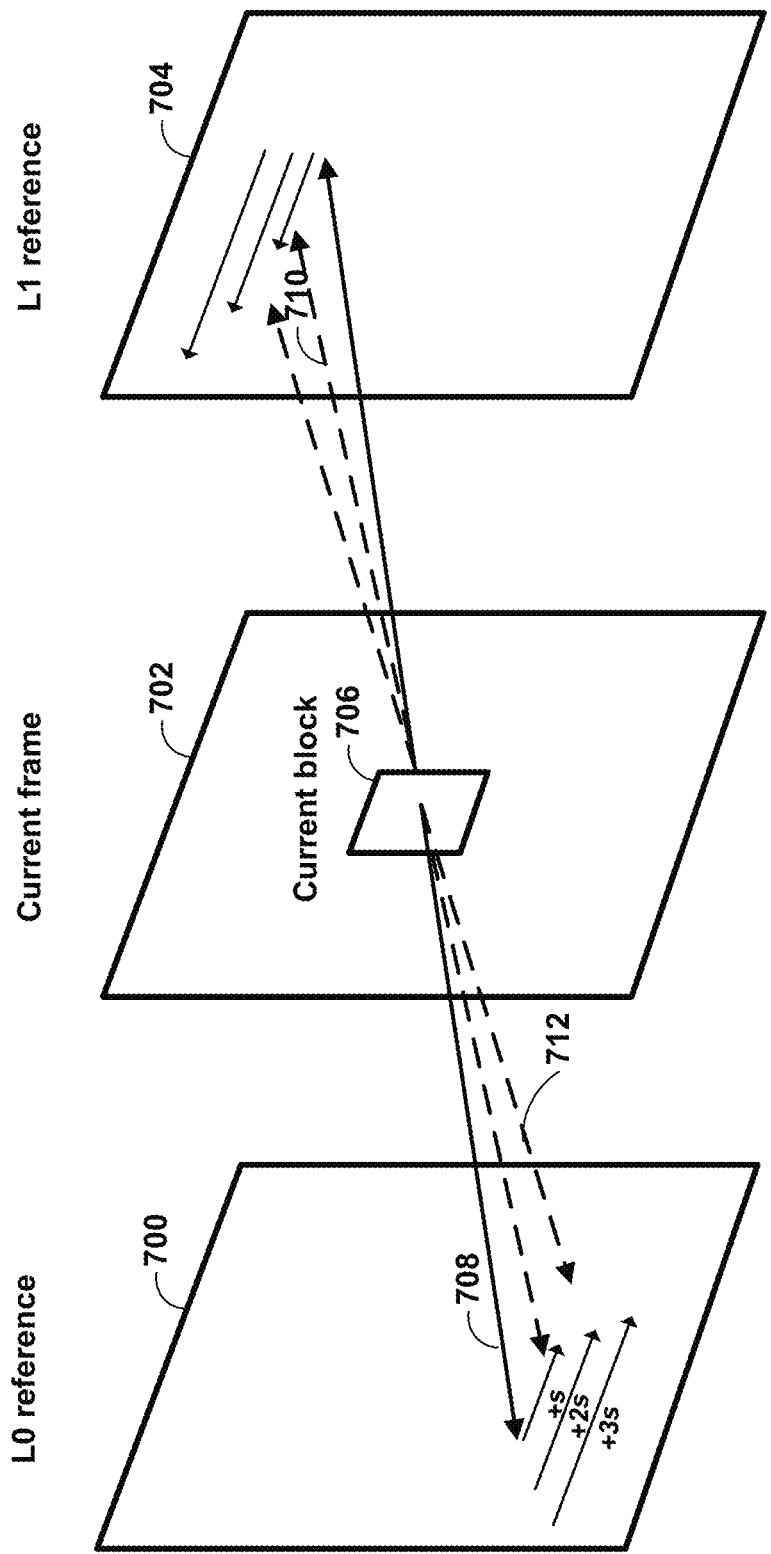
FIG. 6A is a conceptual diagram illustrating a merge motion vector refinement (MMVR) process.

FIG. 6A is a conceptual diagram illustrating an example UMVE search process. As shown in FIG. 6A, a motion vector 708 for current block 706 in current frame 702 may be modified in terms of both motion magnitude and motion direction. Different changes in motion magnitude and motion direction may produce different motion vectors (e.g., motion vector 710 or motion vector 712). Motion vectors 710 and 712 may be called a merge candidate (in this case motion vector 708) with a UMVE (or simply a UMVE candidate). That is, motion vectors 710 and 712 are created by altering motion vector 708 with a UMVE.

Figure 6B:
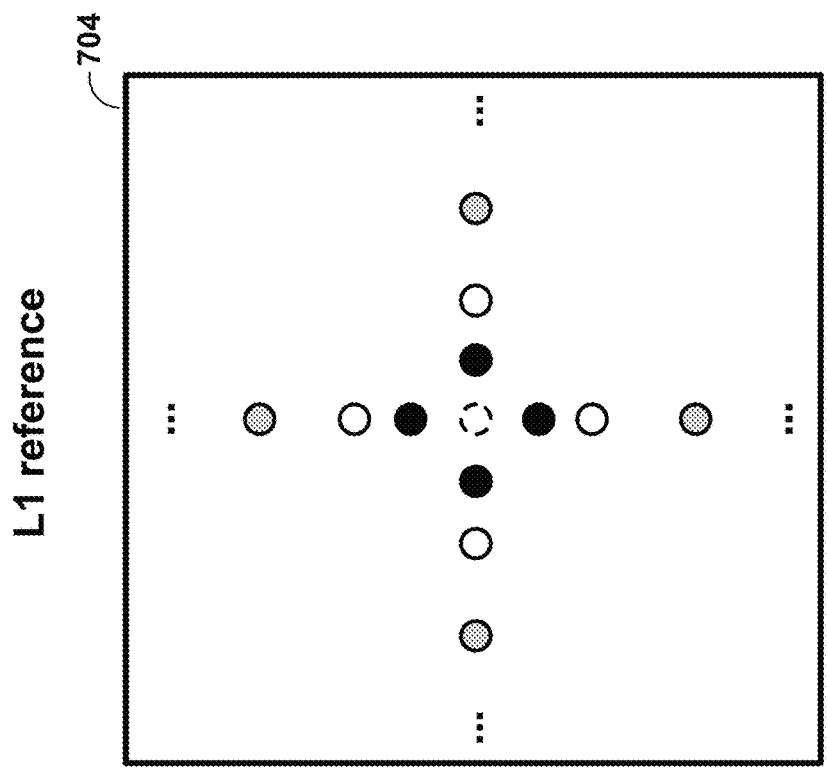
FIG. 6B is a conceptual diagram illustrating an MMVR search point.
Figure 6B:
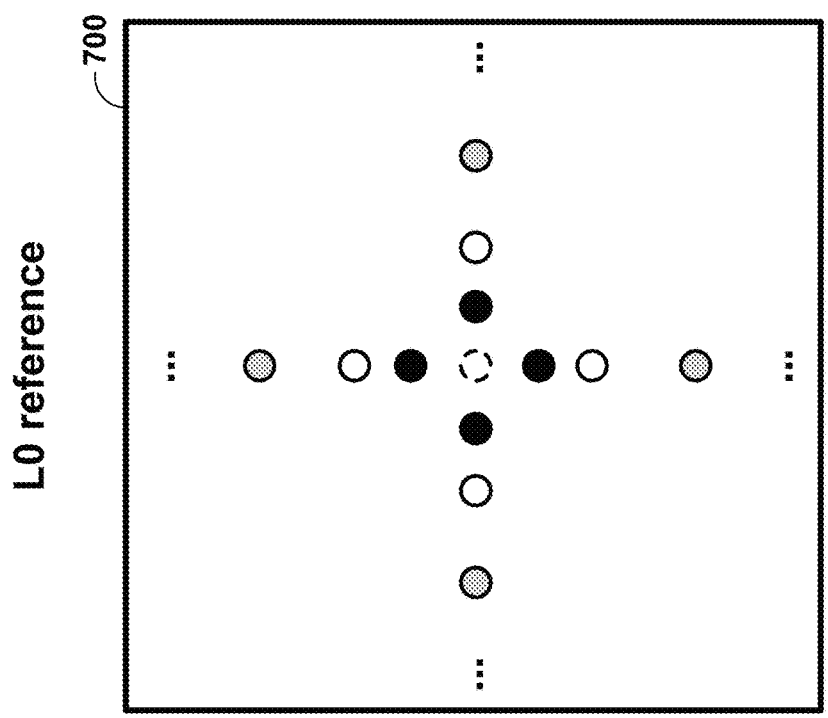

Motion vector 708 may also have different prediction directions. Prediction direction information indicates a prediction direction among L0 (frame 700), L1 (frame 704), and L0 and L1 predictions. For a B slice, using the proposed UMVE techniques, video encoder 200 and video decoder 300 can generate bi-prediction candidates from merge candidates with uni-prediction by using a mirroring technique, as shown in FIG. 6A and FIG. 6B. FIG. 6B is a conceptual diagram illustrating example UMVE search points. For example, if a merge candidate is a uni-prediction candidate with reference list L1, video encoder 200 and video decoder 300 may determine a reference index of reference list L0 by searching a reference picture in list 0, which is mirrored with the reference picture for list 1. If there is no corresponding picture, video encoder 200 and video decoder 300 uses the nearest reference picture to the current picture. Video encoder 200 and video decoder 300 may derive the motion vector of L0 (frame 700) by scaling the motion vector of L1

(frame 704). Video encoder 200 and video decoder 300 may calculate the scaling factor using a picture order count (POC) distance.

Merge Offset Extension

Figure 7:
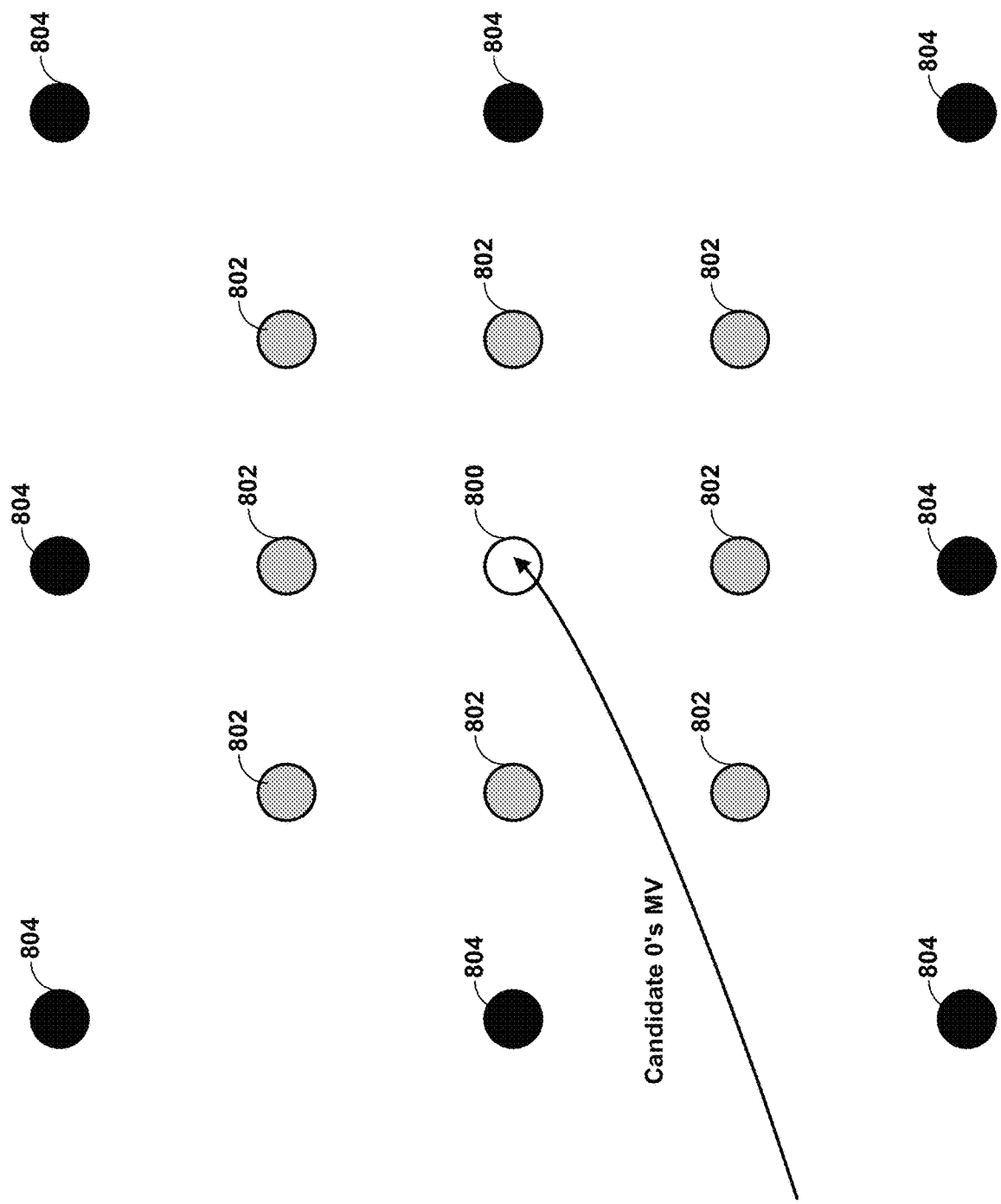
FIG. 7 is a conceptual diagram illustrating offset merge candidates.

X. Chen, et. al., "CE 4: Merge Offset Extension (Test 4.4.8)," Joint Video Experts Team (WET) of ITU-T SG 16 WP 3 and ISO/IEC JTC 1/SC 29/WG 11, 12$^{th}$ Meeting, Macao, CN, 3-12, October 2018, JVET-L0176, describes techniques where new extended MV offset candidates are constructed only based on the first candidate of a merge candidate list. New extended MV offset candidates only include an MV offset to the current MV of a first candidate. Other prediction information is the same as the first candidate. The newly added candidates are pushed in a Merge candidate list after the temporal candidate. The supported motion vector offsets are depicted in FIG. 7, including the points 802 with offsets (0 or ±1, 0 or ±1) relative to current sample 800 and points 804 with offsets (0 or ±2, 0 or ±2) relative to current sample 800.

For bi-prediction with one MV (e.g., MV0) from a reference picture in the past (e.g., list 0) and another (e.g., MV1) from a reference picture in the future (e.g., list 1), video encoder 200 and video decoder 300 may add the selected MV offset to first candidate MV0, and add the reverse MV offset to first candidate MV1. Other bi-prediction cases include adding the same MV offset to first candidate MV0 and MV1, respectively.

History-based Motion Vector Prediction

History-based motion vector prediction (HMVP) (e.g., as described in L. Zhang, et. al., "CE4-related: History-based Motion Vector Prediction," Joint Video Experts Team (WET) of ITU-T SG 16 WP 3 and ISO/IEC JTC 1/SC 29/WG 11, 11th Meeting, Ljubljana, SI, 10-18, July 2018 [JVET-K0104]) is a history-based technique that allows each block to find its MV predictor from a list of MVs decoded from the past in addition to those in immediately adjacent causal neighboring motion fields. A table with multiple HMVP candidates is maintained during the encoding/decoding process. The table is emptied when a new slice is encountered. Whenever there is an inter-coded block, the associated motion information is inserted to the table in a first-in-first-out (FIFO) fashion as a new HMVP candidate. Then, a constraint FIFO rule can be applied. When inserting a HMVP to the table, a redundancy check is first applied to find whether there is an identical HMVP in the table. If an identical HMVP is found, that particular HMVP is removed from the table and all the HMVP candidates afterwards are moved.

HMVP candidates can also be used in the merge candidate list construction process. All HMVP candidates from the last entry to the first entry in the table are inserted after the TMVP candidate. Pruning is applied on the HMVP candidates. Once the total number of available merge candidates reaches the signaled maximally allowed number of merge candidates, the merge candidate list construction process is terminated.

Similarly, HMVP candidates can also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates.

Other Aspects of Motion Prediction in HEVC

Several aspects of merge and AMVP modes are worth mentioning as follows.

Motion vector scaling: It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance between the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete (e.g., has fewer candidates that a predetermined maximum), artificial motion vector candidates are generated and inserted at the end of the list until the list is full.

In merge mode, there are two types of artificial MV candidates: a combined candidate derived only for B-slices and zero candidates used only for AMVP if the first type does not provide enough artificial candidates.

For each pair of candidates that are already in the candidate list and have the necessary motion information, bi-directional combined motion vector candidates are derived by a combination of the motion vector of the first candidate referring to a picture in the list 0 and the motion vector of a second candidate referring to a picture in the list 1.

Pruning process for candidate insertion: Candidates from different blocks may happen to be the same, which decreases the efficiency of a merge/AMVP candidate list. A pruning process may be applied to address this problem. The pruning process compares one candidate against the others in the current candidate list to avoid inserting identical candidate in certain extent. To reduce the complexity, only limited numbers of pruning processes are applied instead of comparing each potential candidate with all the other existing candidates.

Bilateral Template Matching

Figure 8:
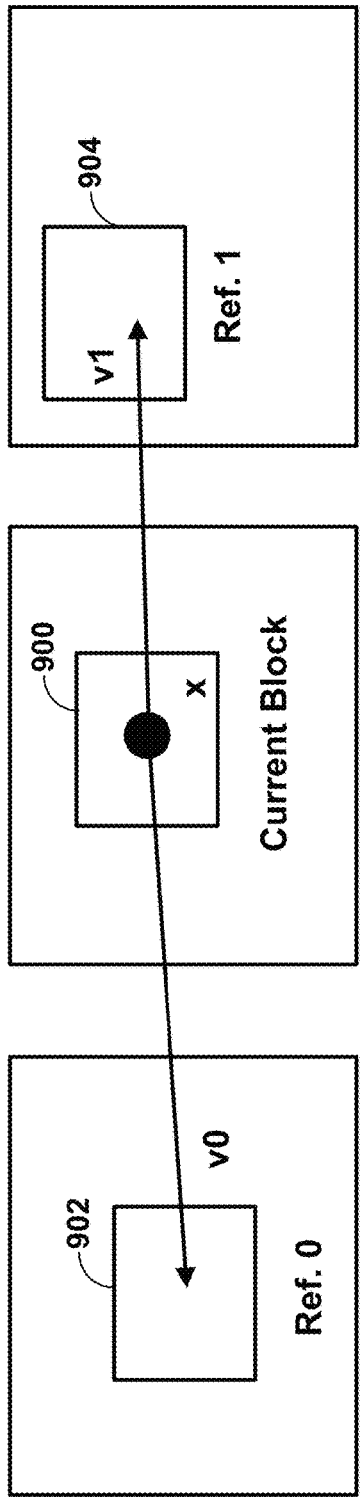
FIG. 8 is a conceptual diagram illustrating bilateral template matching.
Figure 8:
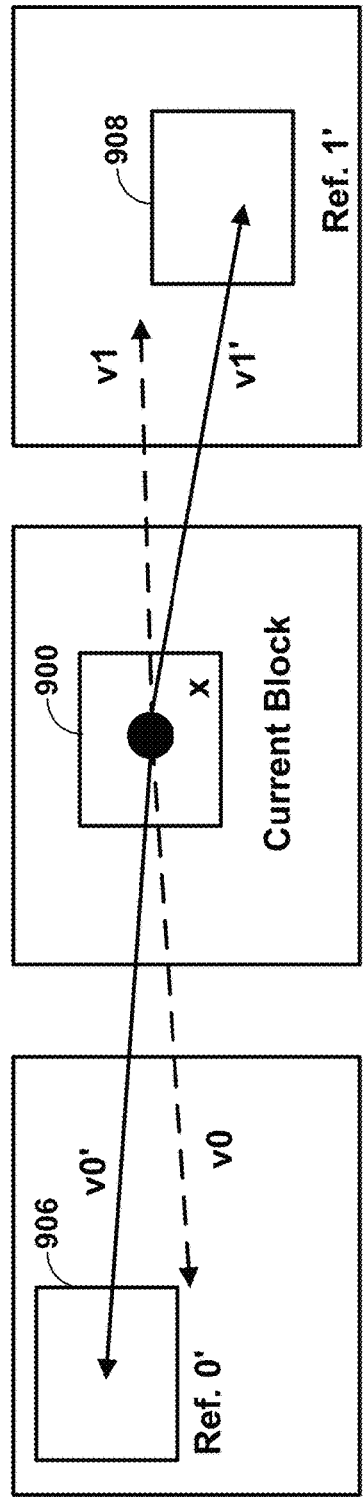

FIG. 8 is a conceptual diagram illustrating bilateral template matching. Bilateral matching is a variant of a decoder-side motion vector refinement (DMVR) technique to avoid a template-based refinement process. Bilateral template matching for current block 900 includes computing the bilateral matching cost directly between the uni-prediction reference blocks 902 and 904 (denoted as $I_0(x+v_0)$ and $I_1(x+v_1)$ and x as the coordinate of a pixel within the current block 900) pointed to by the initial bi-prediction MVs (e.g., $v_0$ and $v_1$ in FIG. 8).

Video encoder 200 and video decoder 300 may perform a local search based on bilateral matching within a pre-defined search range around the initial bi-prediction MVs. Specifically, supposing the initial MVs are $v_0^{(0)}$ and $v_1^{(0)}$, at the first search iteration, several MV pairs (e.g. $v_0^{(0)}+\Delta$ and $v_1^{(0)}-\Delta$ where $\Delta \in \{(0,0), (-1,1), (0,1), (1,1), (1,0), (1,-1), (0,-1), (-1,-1), (-1,0),$ and so on$\}$) are tested to determine the optimal value of $\Delta^*$ which leads to the lowest bilateral matching cost. In this disclosure, the cost function is defined as the distortion between $I_0(x+v_0^{(0)}+\Delta)$ and $I_1(x+v_1^{(0)}-\Delta)$ plus motion cost. The distortion function can be either Mean Removed sum of absolute differences (MRSAD) or sum of absolute differences (SAD). FIG. 8 shows example search blocks 906 and 908 indicated by one of the tested MV pairs in the first search iteration.

After the optimal $\Delta^*$ is found, the iteration process performed by video encoder 200 and video decoder 300 updates the values of the initial MVs ($v_0^{(0)}$ and $v_1^{(0)}$) by using $\Delta^*$. Specifically, $v_0^{(1)}=v_0^{(0)}+\Delta^*$ and $v_1^{(1)}=v_1^{(0)}-\Delta^*$). Then, after advancing all the superscripts in the above description by 1, the same iteration process repeats until $\Delta^*$ is equal to (0,0) is reached. The output MV pair (denoted as $v_0^{(n)}$ and $v_1^{(n)}$, n≥1) may be then refined again at a sub-pel precision. The resulting MV pair is then taken to replace the original MVs ($v_0^{(0)}$ and $v_1^{(0)}$) of the merge block. Motion compensation is then performed based on the refined MVs.

Parametric Sub-pel Motion Vector Derivation

In S. Sethurman, et. al., "Decoder Side MV Refinement/Derivation with CTB-level concurrency and other normative complexity reduction techniques," Joint Video Experts Team (WET) of ITU-T SG 16 WP 3 and ISO/IEC JTC 1/SC 29/WG 11, 11th Meeting, Ljubljana, SI, 10-18, July 2018, JVET-K0041, a quadratic parametric function is used to form a prediction error surface for each possible fractional-pel MV. Basically, the quadratic parametric function is an interpolation function which interpolates the value of prediction errors as estimators. Based on the exact prediction errors values from integer search, parameters of the quadratic parametric function are derived, and thus the best motion sampling location on this error search can be found. Then, the original MVs are adjusted to this exact motion sampling location, instead of actually performing sub-pel motion vector estimation. This parametric function takes the cost values from five points as reference to form an error surface and find the best position with the lowest cost value on this surface. The five points form a cross shape and the gap between each two adjacent points is of 2 pixels, where center/left/right/top/bottom point is coordinated at (0,0)/(−1,0)/(1,0)/(0,−1)/(0,1). This parametric error surface function is a 2-D parabolic error surface equation:

$$E_{x,y}=A(x-\Delta x)^2+B(y-\Delta y)^2+C,$$

where ($\Delta x$, $\Delta y$) corresponds to the position with the least cost and C corresponds to the minimum cost value. By solving the 5 equations in 5 unknowns ($\Delta x$, $\Delta y$) is computed as:

$$\Delta x=\text{floor}((\alpha(E_{-1,0}-E_{1,0}))/(2(E_{-1,0}+E_{1,0}-2E_{0,0}))),$$

$$\Delta y=\text{floor}((\alpha(E_{0,-1}-E_{0,1}))/(2(E_{0,-1}+E_{0,1}-2E_{0,0}))),$$

where $\alpha$ is an integer scaling factor introduced to represent ($\Delta x$, $\Delta y$) in a certain sub-pel precision, e.g., 16 for $1/16^{th}$ precision and 4 for $1/4^{th}$ precision.

Motion Vector Prediction using Decoder-side Derived Motion Vectors

Although decoder-side motion vector derivation (DMVD) is efficient in reducing motion overhead, existing DMVD designs (such as DMVR) may encounter a decoding latency issue due to the interdependency between the coding of spatial neighboring CUs. If the MVs of a CU are predicted from its spatial neighbors coded using DMVR, the decoding process has to wait until the refined MVs of the neighboring CU become available. In the development of the Versatile Video Coding standard, there are several techniques studied that may achieve a low-latency design for some decoder-side MV derivation (DMVD) approaches. Some of these techniques are elaborated below.

No Spatial MV Prediction from Immediately Previous DMVD Block

For a block coded by using a DMVD technique, the decoding process can be interpreted in three steps:
1. reconstruction of initial motion field and prefetching reference blocks;
2. refinement process for block motions to get final MVs; and
3. motion compensation with final MVs.

Figure 9:
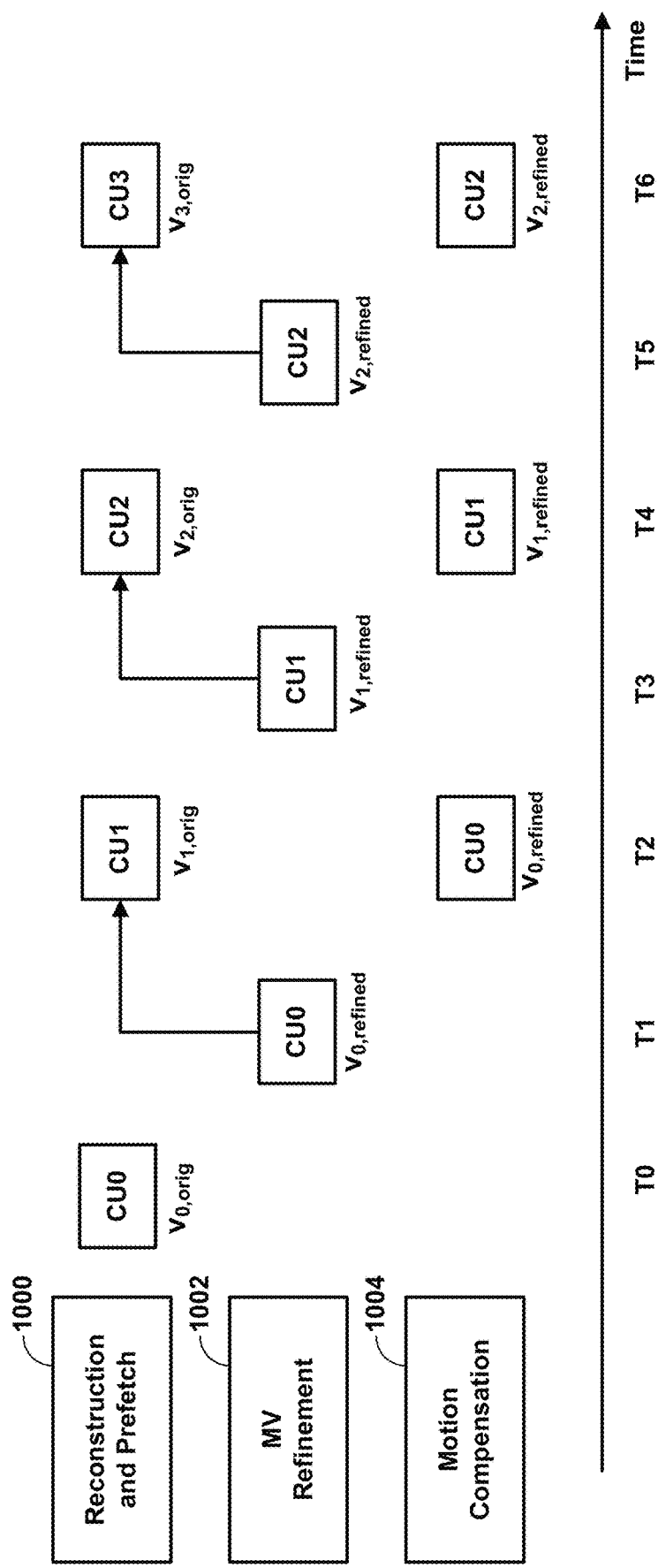
FIG. 9 is a conceptual diagram illustrating example pipeline states for decoder-side motion vector derivation (DMVD) techniques.

After the refinement process in Step 2, final MVs are written back to a picture motion field, so the refined MVs can be used as for spatial MV prediction, temporal MV prediction and boundary strength calculation. FIG. 9 demonstrates a certain implementation of pipeline stages for DMVD techniques such as DMVR. In FIG. 9, the three major modules reconstruction and prefetch 1000, MV refinement 1002, and motion compensation 1004 represent the three decoding steps for DMVD techniques. Modules 1000, 1002, and 1004 may be part of motion compensation unit 316 of video decoder 300 (see FIG. 3). As shown in FIG. 9, at time T0, reconstruction and prefetch is performed for CU0 having an original motion vector V0. At time T1, the original motion vector V0 is refined to create refined motion vector V0. At time T3, the refined motion vector V0 is used in the reconstruction and prefetch for CU1. Also at time T3, motion compensation is performed for CU0 using the refined motion vector V0. This cascading process continues for future CUs.

In general, $CU_{prev}$ is a previously coded CU before the current one ($CU_{cur}$). When reconstructing the original MVs of $CU_{cur}$, if a MV predictor is from $CU_{prev}$ which happens to be a DMVD-coded block, this predictor is marked as unavailable for the $CU_{cur}$. Consequently, the reconstruction of initial MVs of $CU_{cur}$ no longer depends on the refined MVs of $CU_{prev}$ and the interdependency between MV refinement and MV prediction is removed to some extent.

No Spatial MV Prediction from DMVD Blocks in Current Frame

Instead of using the refined MVs, this technique uses the original MVs of each DMVR CU to derive the spatial MV predictors. For temporal MV prediction, refined MVs can be used without the decoding-latency issue, because the collocated picture has been fully reconstructed. Accordingly, the decoding-latency issue of DMVR can be fully solved as the coding dependency between spatial neighboring CUs no longer exists. However, a decline of coding performance can be expected.

No Spatial MV Prediction from DMVD Blocks in Current CTU Row

This technique takes unrefined MVs as reference from immediately neighboring blocks to perform spatial MV prediction, if these neighboring blocks together with the current one all fall in the same CTU row. (It is noted that some other technique may mark the MV predictors from such neighboring blocks as unavailable.) On the contrary, refined MVs are only available for spatial MV prediction only when their associated blocks fall within a neighboring causal CTU located at the immediately above CTU and above-left CTU. Accordingly, this technique breaks the inter-dependency between MV refinement and spatial MV prediction inside a CTU row.

Bi-directional Optical Flow in JEM

Figure 10:
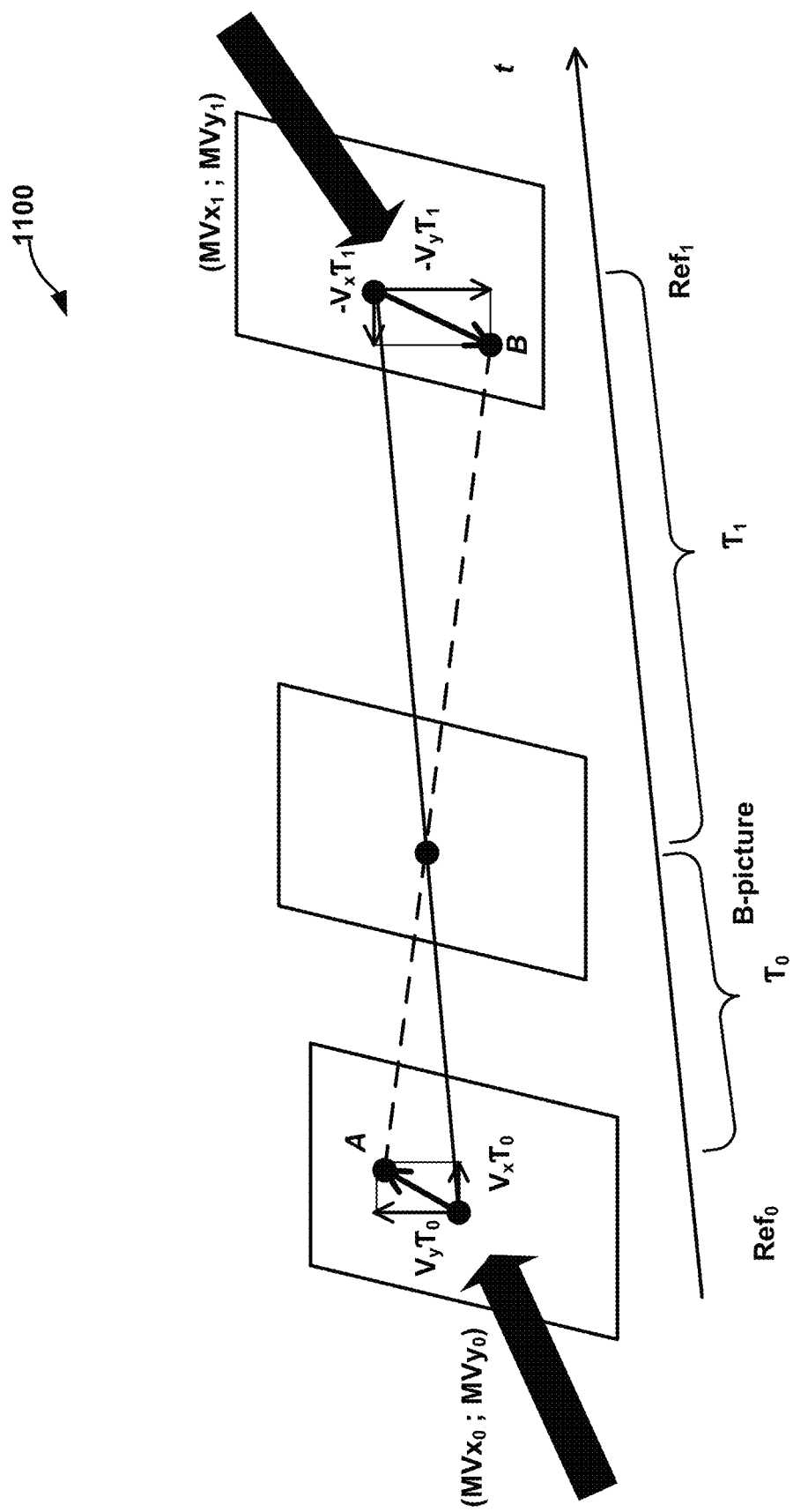
FIG. 10 is a conceptual diagram illustrating an example optical flow trajectory.

Bi-directional Optical flow (BIO) is pixel-wise motion refinement which is performed on top of block-wise motion compensation in a case of bi-prediction. Since BIO compensates the fine motion inside the block, enabling BIO results in enlarging block sizes for motion compensation. Sample-level motion refinement does not require exhaustive search or signaling since there is an explicit equation which gives the fine motion vector for each sample. FIG. 10 is a conceptual diagram illustrating optical flow trajectory 1100.

$I^{(k)}$ is a luminance value from reference k (k=0, 1) after compensation block motion, and $\partial I^{(k)}/\partial x$, $\partial I^{(k)}/\partial y$ are horizontal and vertical components of the $I^{(k)}$ gradient respectively. Assuming the optical flow is valid, the motion vector field $(v_x, v_y)$ is given by an equation:

$$\partial I^{(k)}/\partial t + v_x \partial I^{(k)}/\partial x + v_y \partial I^{(k)}/\partial y = 0. \quad (1)$$

Combining an optical flow equation with Hermite interpolation for motion trajectory of each sample, a unique polynomial of third order is obtained which matches both function values $I^{(k)}$ and derivatives $\partial I^{(k)}/\partial x$, $\partial I^{(k)}/\partial y$ at the ends. The value of this polynomial at t=0 is BIO prediction:

$$\text{pred}_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Here $\tau_0$ and $\tau_1$ denote the distance to reference frames, as shown on FIG. 10. Distances $\tau_0$ and $\tau_1$ are calculated based on POC for Ref0 and Ref1:

$\tau_0 = \text{POC}(\text{current}) - \text{POC}(\text{Ref0})$, $\tau_1 = \text{POC}(\text{Ref1}) - \text{POC}(\text{current})$. If both predictions come from the same time direction (both from the past or both from the future,) then signs are different $\tau_0 \cdot \tau_1 < 0$. In this case BIO is applied only if prediction is not from the same time moment ($\tau_0 \neq \tau_1$), both referenced regions have non-zero motion:

$(MVx_0, MVy_0, MVx_1, MVy_1 \neq 0)$, and the block motion vectors are proportional to the time distance:

$(MVx_0/MVx_1 = MVy_0/MVy_1 = -\tau_0/\tau_1)$.

The motion vector field $(v_x, v_y)$ is determined by minimizing the difference $\Delta$ between values in points A and B (intersection of motion trajectory and reference frame planes on FIG. 10). The model uses only the first linear term of local Taylor expansion for $\Delta$:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in equation (1) depend on sample location (i', j'), which was omitted so far. Assuming the motion is consistent in local surrounding samples, $\Delta$ inside $(2M+1) \times (2M+1)$ square window $\Omega$ centered in the currently predicted point (i,j) can be minimized as follows:

$$(v_x, v_y) = \underset{v_x, v_y}{\operatorname{argmin}} \sum_{[i',j'] \in \Omega} \Delta^2[i', j'] \quad (4)$$

For this optimization problem, a simplified solution making first minimization in the vertical directions and then in horizontal directions may be used, which results in:

$$v_x = (s_1 + r) > m ? \operatorname{clip3}\left(-thBIO, thBIO, -\frac{s_3}{(s_1+r)}\right) : 0 \quad (5)$$

$$v_y = (s_5 + r) > m ? \operatorname{clip3}\left(-thBIO, thBIO, -\frac{s_6 - v_x s_2/2}{(s_5+r)}\right) : 0 \quad (6)$$

-continued where, $$s_1 = \sum_{[i',j'] \in \Omega} (\tau_1 \partial I^{(1)}/\partial x + \tau_0 \partial I^{(0)}/\partial x)^2; \quad (7)$$

$$s_3 = \sum_{[i',j'] \in \Omega} (I^{(1)} - I^{(0)})(\tau_1 \partial I^{(1)}/\partial x + \tau_0 \partial I^{(0)}/\partial x);$$

$$s_2 = \sum_{[i',j'] \in \Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j'] \in \Omega} (\tau_1 \partial I^{(1)}/\partial y + \tau_0 \partial I^{(0)}/\partial y)^2;$$

$$s_6 = \sum_{[i',j'] \in \Omega} (I^{(1)} - I^{(0)})(\tau_1 \partial I^{(1)}/\partial y + \tau_0 \partial I^{(0)}/\partial y)$$

In order to avoid division by zero or by a very small value, regularization parameters r and m may be introduced in equations (2), (3), e.g., as follows:

$$r = 500 \cdot 4^{d-8} \quad (8)$$

$$m = 700 \cdot 4^{d-8} \quad (9)$$

Here d is the internal bit-depth of the input video.

In some cases, the MV regiment of BIO might be unreliable due to noise or irregular motion. Therefore, in BIO, the magnitude of the MV regiment is clipped to a certain threshold thBIO. The threshold value is determined based on whether all the reference pictures of the current picture are all from one direction. If all the reference pictures of the current pictures of the current picture are from one direction, the value of the threshold is set to $12 \times 2^{14-d}$; otherwise, the threshold is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for a motion compensation process and fractional position (fracX, fracY) according to the fractional part of a block motion vector. In the case of a horizontal gradient, a $\partial I/\partial x$ signal is first interpolated vertically using BIOfilterS corresponding to the fractional position fracY with de-scaling shift d-8; then gradient filter BIOfilterG is applied in the horizontal direction corresponding to the fractional position fracX with de-scaling shift by 18-d. In the case of a vertical gradient $\partial I/\partial y$, a first gradient filter is applied vertically using BIOfilterG corresponding to the fractional position fracY with de-scaling shift d-8; then signal displacement is performed using BIOfilterS in the horizontal direction corresponding to the fractional position fracX with de-scaling shift by 18-d. The length of interpolation filter for gradients calculation BIOfilterG and signal displacement BIOfilterF is shorter (6-tap) in order to maintain low implementation complexity, while achieving a desirable bitrate and/or distortion.

Figure 11:
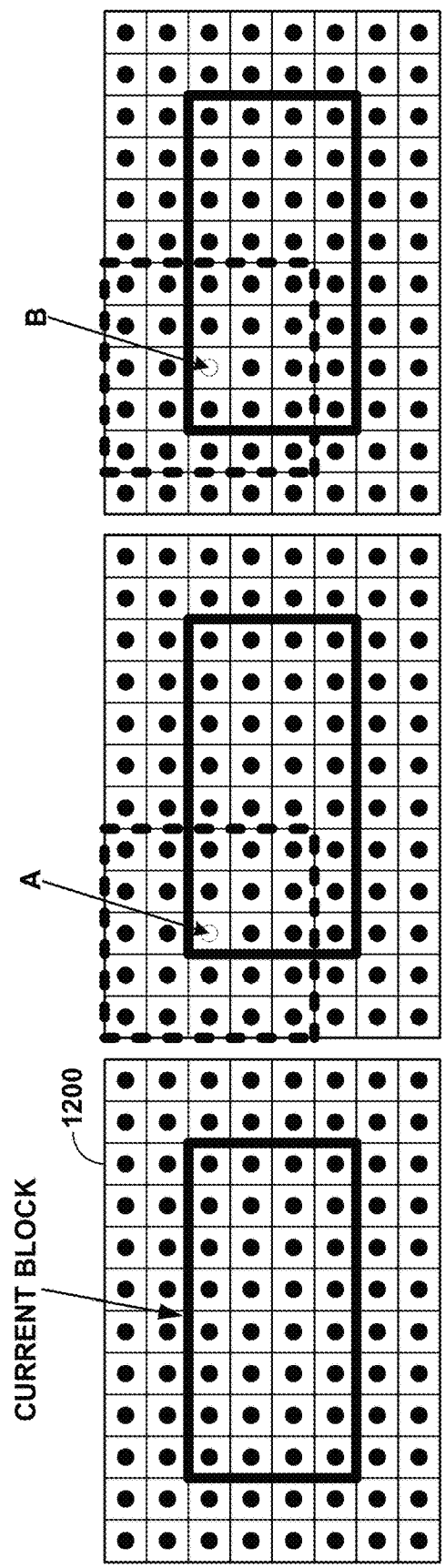
FIG. 11 is a conceptual diagram illustrating an example bi-directional optical flow (BIO) for an 8×4 block.

FIG. 11 is a conceptual diagram illustrating bi-directional optical flow (BIO) for an 8×4 current block 1200. FIG. 11 particularly shows an example of the gradient calculation for current block 1200. For 8×4 current block 1200, a video coder fetches the motion compensated predictors and calculates the HOR/VER gradients of all the pixels within current block as well as the outer two lines of pixels. This is because solving vx and vy for each pixel needs the HOR/VER gradient values and motion compensated predictors of the pixels within the window $\Omega$ centered in each pixel as shown in equation (4). In JEM, the size of this window is set to 5×5. As such, the video coder fetches the motion compensated predictors and calculates the gradients for the outer two lines of pixels.

In JEM, BIO is applied to all bi-directional predicted blocks when the two predictions are from different reference pictures. When LIC is enabled for a CU, BIO is disabled.

Generalized Bi-Prediction (GBi)

GBi was proposed in C. Chen, "Generalized bi-prediction for inter coding," Joint Video Experts Team (JVET) of ITU-T SG 16 WP 3 and ISO/IEC JTC 1/SG 29/WG 11, $3^{rd}$ Meeting: Geneva, CH, 26 May-1 Jun. 2016, JVET-00047. In Y. Su, et. al., "CE4.4.1: Generalized bi-prediction for inter coding," Joint Video Experts Team (JVET) of ITU-T SG 16 WP 3 and ISO/IEC JTC 1/SC 29/WG 11, 11th Meeting, Ljubljana, SI, 10-18, July 2018, JVET-K0248, the proposal improved the gain-complexity trade-off for GBi and was adopted into Benchmark Set 2.1 (BMS2.1) of VVC. The BMS2.1 GBi applies unequal weights to predictors from L0 and L1 in bi-prediction mode. In inter prediction mode, multiple weight pairs, including the equal weight pair (½, ½), are evaluated based on rate-distortion optimization (RDO), and the GBi index of the selected weight pair is signaled to video decoder 300. In merge mode, the GBi index is inherited from a neighboring CU. In BMS2.1 GBi, the predictor generation in bi-prediction mode is shown below.

$$P_{GBi} = (w_0 * P_{L0} + w_1 * P_{L1} + \text{RoundingOffset}_{GBi}) >> \text{shiftNum}_{GBi}, \quad (10)$$

where $P_{GBi}$ is the final predictor of GBi. Weights $w_0$ and $w_1$ are the selected GBi weight pair and are applied to the predictors of list 0 (L0) and list 1 (L1), respectively. RoundingOffset$_{GBi}$ and shiftNum$_{GBi}$ are used to normalize the final predictor in GBi. The supported w1 weight set is {−¼, ⅜, ½, ⅝, 5/4}, in which the five weights correspond to one equal weight pair and four unequal weight pairs. The blending gain, i.e., sum of $w_1$ and $w_0$, is fixed to 1.0. Therefore, the corresponding w0 weight set is {5/4, ⅝, ½, ⅜, −¼}. The weight pair selection is at the CU-level.

For non-low delay pictures, the weight set size is reduced from five to three, where the $w_1$ weight set is {⅜, ½, ⅝} and the $w_0$ weight set is {⅝, ½, ⅜}. The weight set size reduction for non-low delay pictures is applied to the BMS2.1 GBi and all the GBi tests in JVET-K0248.

This disclosure describes the following techniques for decoder side motion vector refinement.

1.1 Restricted Decoder Side Motion Vector Refinement

This disclosure proposes to disable decoder side motion refinement if the two weights for bi-predicted prediction is not equal. That is, for a bi-predicted block of video data coded using two motion vectors, video encoder 200 and video decoder 300 may be configured to determine if weights used for the bi-predicted prediction are equal. Video encoder 200 and video decoder 300 may determine the weights that are to be used for the bi-predicted prediction. If the weights are not equal, video encoder 200 and video decoder 300 may not apply (e.g., disable) a motion vector refinement process (e.g., bilateral template matching) to the motion vectors used for the bi-predicted prediction. That is, video encoder 200 and video decoder 300 may code the block of video data using the bi-predicted prediction without motion vector refinement. If the weights are equal, video encoder 200 and video decoder 300 may apply (e.g., enable) a motion vector refinement process (e.g., bilateral template matching) to the motion vectors used for the bi-predicted prediction. That is, video encoder 200 and video decoder 300 may code the block of video data using the bi-predicted prediction with motion vector refinement.

For example, if GBi is applied as the bi-predicted prediction and the weights w0 and w1 are not equal, then video encoder 200 and video decoder 300 may disable a decoder side motion vector refinement process. In another example, if the weighted bi-predicted prediction is used to code the current block and the weights w0 and w1 are not equal, then video encoder 200 and video decoder 300 may disable a decoder side motion vector refinement process. In the above examples, bilateral template matching may be used as the motion vector refinement (e.g., DMVR) process. However, the techniques of this disclosure may be used with any motion vector refinement process.

Accordingly, in one example of the disclosure, video encoder 200 and video decoder 300 may be configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process. In one example, the weights used for the bi-predicted prediction of the current block are not equal. In this example, video encoder 200 and video decoder 300 may be configured to determine to disable the motion vector refinement process.

1.2 Adaptive on/off for Decoder Side Motion Vector Refinement

The techniques of section 1.2 may be applied together with the techniques of section 1.1 or may be applied independently. The two motion vectors (e.g., from list 0 and list 1) used for the bi-predicted prediction of the current block point to two different blocks in one or more reference pictures. In another example of the disclosure, if the difference between the two predicted blocks using the two original motion vectors (i.e., before any motion vector refinement) is less than a threshold, video encoder 200 and video decoder 300 may not apply (e.g., disable) a motion vector refinement process (e.g., DMVR) for the current coding block.

Video encoder 200 and video decoder 300 may be configured to measure the "difference" between the predicted blocks using a sum of the absolute difference (SAD) or sum of the squared error (SSE) of the two predicted blocks. Of course, other techniques may be used. In some examples, video encoder 200 and video decoder 300 may use some simplification techniques to skip some samples in the predicted blocks for calculating the difference. For example, video encoder 200 and video decoder 300 may calculate the SAD/SSE of the predicted blocks using every other line of samples of the predicted blocks.

Video encoder 200 and video decoder 300 may determine the "threshold" used to determine whether or not to apply motion vector refinement from the number of samples in the predicted block and the bitdepth of the samples. For example, video encoder 200 and video decoder 300 may calculate the threshold as: $(N<<(BD-8))*W*H$. W and H are the width and height of the block, respectively. BD is the bitdepth of the sample. N is a predefined value, for example 1,2, 4, 8, et al. N can also be signaled in high level syntax. The operator << is a bitwise right shift.

In another technique, video encoder 200 and video decoder 300 may determine the threshold from the number of samples in the predicted block that are used to calculate SAD/SSE and the bitdepth of the samples. For example, if the SAD/SSE is calculated every other line, then the threshold is: $(N<<(BD-8))*W*H/2$.

Accordingly, in another example of the disclosure, video encoder 200 and video decoder 300 may be configured to determine a difference between predicted blocks identified by the motion vectors. To determine to use the motion vector refinement process on the motion vectors based on weights used for the bi-predicted prediction of the current block, video encoder 200 and video decoder 300 may be configured to determine to use the motion vector refinement process on the motion vectors based on weights used for the bi-predicted prediction of the current block and the determined difference between the predicted blocks identified by the motion vectors.

In another example, to determine to use the motion vector refinement process on the motion vectors based on weights used for the bi-predicted prediction of the current block and the determined difference between the predicted blocks identified by the motion vectors, video encoder 200 and video decoder 300 may be configured to determine to disable the motion vector refinement process in the case that the difference between the predicted blocks identified by the motion vectors is less than a threshold.

In another example, to determine the difference between the predicted blocks identified by the motion vectors, video encoder 200 and video decoder 300 may be configured to determine the difference between the predicted blocks identified by the motion vectors using a sum of absolute differences between the predicted blocks or a sum of squared error between the predicted blocks.

In another example of the disclosure, video encoder 200 and video decoder 300 may be configured to determine the threshold based on a number of samples in the predicted blocks and a bitdepth of the samples in the predicted blocks.

1.3 Motion Compensation for Bilateral Template Matching

In bilateral template matching, as described above, video encoder 200 and video decoder 300 obtain two predicted blocks. In case of a non-integer motion vector, video encoder 200 and video decoder 300 obtain the predicted block by interpolation. In some examples when the interpolation is required, such as in HEVC, video encoder 200 and video decoder 300 obtain the predicted block by first performing a horizontal interpolation then followed by a vertical interpolation. The output of the horizontal interpolation is the input for the vertical interpolation. Video encoder 200 and video decoder 300 may perform the interpolation by weighted averaging a certain number of samples, i.e., multiplying interpolation coefficients with corresponding samples and then normalizing by dividing the sum of the weights.

The intermediate data obtained after horizontal interpolation may be stored in a higher bitdepth to reduce the rounding error. The internal bitdepth for coding is bitDepthI, and the bitdepth for the intermediate data obtained during interpolation (e.g., after horizontal interpolation) is bitDepthIF. In some examples, video encoder 200 and video decoder 300 shifts the result of the horizontal interpolation (weighted sum of samples) to achieve the internal interpolation bitdepth bitDepthIF. In some examples, video encoder 200 and video decoder 300 may apply some offset before shifting. This shift number may be called shift1. The result of vertical interpolation may also be shifted to achieve the internal bitDepth bitDepthI. This shift number may be called shift2. The number for the variable precIF is chosen such that the sum of the weights is less than or equal to 2 to the power of precIF.

Technique 1

In a first technique of the disclosure, the bitdepth of the predicted blocks in bilateral template matching is fixed and is not necessarily the same as the internal bitdepth for coding the video. Then, video encoder 200 and video decoder 300 may determine the "threshold" described in section 1.2 by the fixed bitdepth of the predicted block. For example, the bitdepth is 10, and the threshold is $(1<<2)*W*H/2$, i.e. $4*W*H/2$. Therefore, the threshold is independent of the internal bitdepth for coding the video. Video encoder 200 and video decoder 300 may shift the result of vertical interpolation to achieve the internal interpolation bitdepth bitDepthIF instead of the internal bitdepth bitDepthI.

In one example, the number shift1 is set as precIF-min(precIF, bitDepthIF-bitDepthI), and the number shift2 is set as precIF. If the shifting number is larger than 0, video encoder 200 and video decoder 300 may apply an offset before right shifting. For shift1, if shift1 is larger than 0, the offset is $1<<(shift1-1)$. For shift2, if shift2 is larger than 0, the offset is $1<<(shift2-1)$. If interpolation is not applied, i.e., the motion vector is not fractional, then video encoder 200 and video decoder 300 may apply shifting to achieve the same intermediate bitdepth and output bitdepth. In one example, when bilinear interpolation is used, precIF is 4 and bitDepthIF is 10. The number shift1 is 4-min(4, 10-bitDepthI), and shift2 is 4. If the x component of the motion vector is zero, i.e., the horizontal interpolation is not performed, then shift2 is reset as precIF-min(precIF, bitDepthIF-bitDepthI).

In another example, the number shift1 is set as precIF-min(precIF-1, bitDepthIF-bitDepthI), and the number shift2 is set as precIF. If the x component of the motion vector is zero, i.e., the horizontal interpolation is not performed, then shift2 is reset as precIF-min(precIF, bitDepthIF-bitDepthI).

In still another example, the number shift1 is set as precIF-(bitDepthIF-bitDepthI), and the number shift2 is set as precIF. This is because bitDepthIF-bitDepthI is usually less than precF.

The interpolation filter for the predicted blocks in bilateral template matching may be different from that for normal motion compensation. Therefore, precIF and bitDepthIF of bilateral template matching may be different from those of normal motion compensation.

In view of the foregoing, to apply the bilateral template matching on the motion vectors, video encoder 200 and video decoder 300 may be configured to determine two predicted blocks for the current block using bilateral template matching, wherein a first predicted block of the two predicted blocks is determined based on the motion vectors for the current block, and wherein the motion vectors include a non-integer motion vector. To determine the first predicted block, video encoder 200 and video decoder 300 may be configured to perform a horizontal interpolation based on the non-integer motion vector, store the output of the horizontal interpolation at a higher bitdepth than an internal bitdepth, and use the output of the horizontal interpolation stored at the higher bitdepth to perform a vertical interpolation. The techniques of this disclosure may increase coding efficiency and/or simplify implementation of DMVR techniques.

Technique 2

In a second technique, the bitdepth of the predicted blocks is set to be the same as the internal bitdepth for coding the video. Therefore, the bitdepth of the predicted blocks depends on the internal bitdepth for coding the video. The "threshold" described in section 1.2 is determined by the internal bitdepth for coding the video. In one example, precIF and bitDepthIF of bilateral template matching may be different from those of normal motion compensation.

In another example, the interpolation process for bilateral template matching and normal motion compensation is unified. In that example, precIF and bitDepthIF of bilateral template matching are the same as in normal motion compensation.

Figure 12:
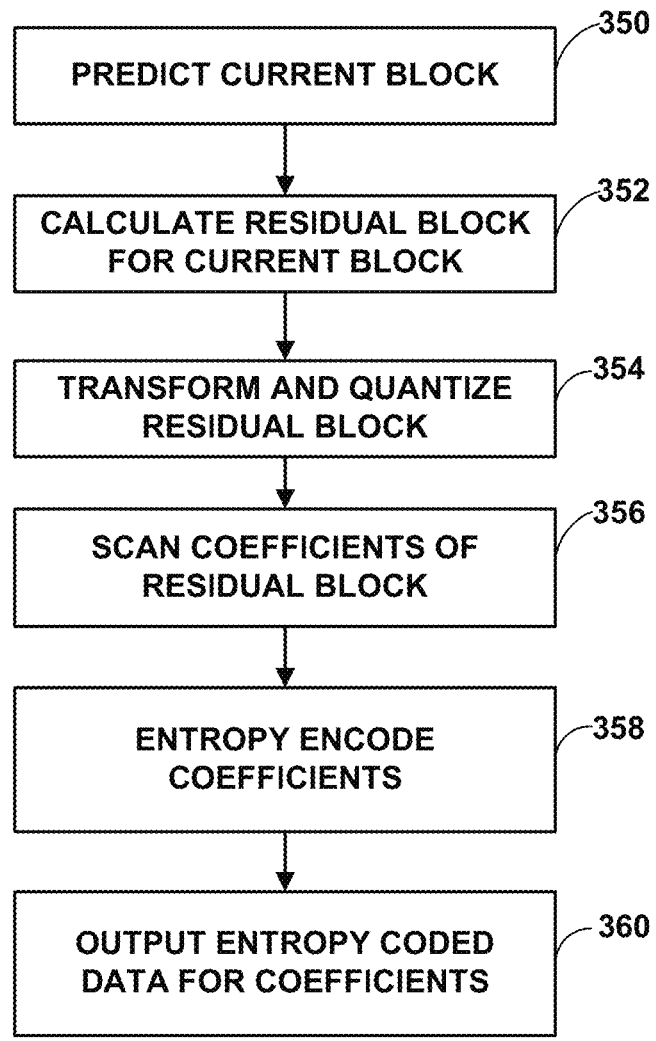
FIG. 12 is a flowchart illustrating an example encoding method.

FIG. 12 is a flowchart illustrating an example method for encoding a current block. The current block may comprise a current CU. Although described with respect to video encoder 200 (FIGS. 1 and 2), it should be understood that other devices may be configured to perform a method similar to that of FIG. 12.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 13:
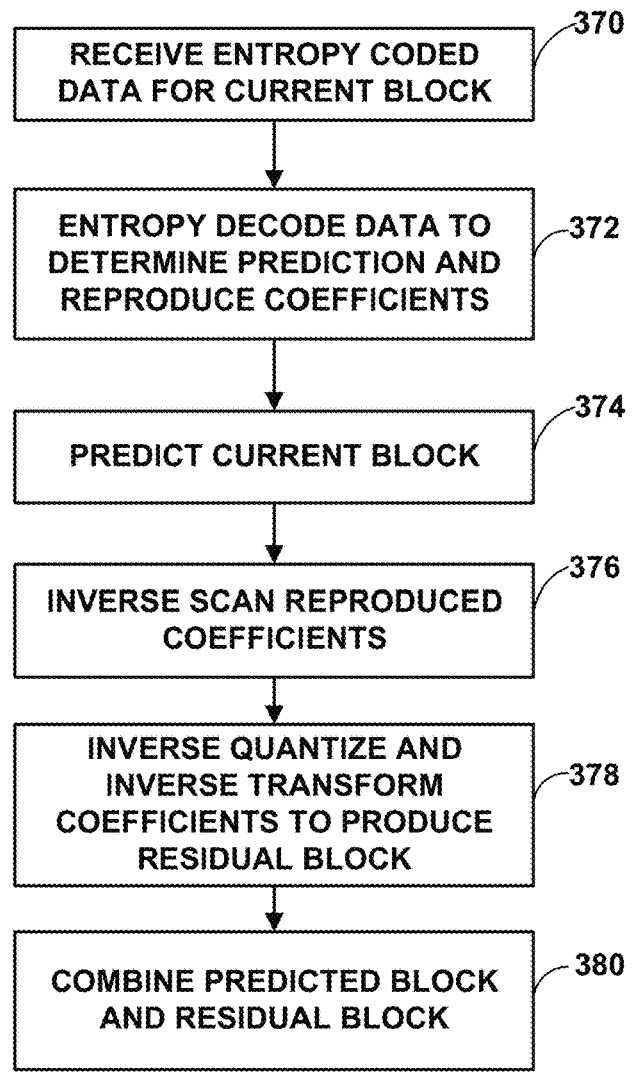
FIG. 13 is a flowchart illustrating an example decoding method.

FIG. 13 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 13.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. The techniques of this disclosure for determining whether or not to perform motion vector refinement, e.g., as described in FIG. 14 and FIG. 15 below, may be performed by video decoder 300 prior to and/or during process 374 of FIG. 13. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 14:
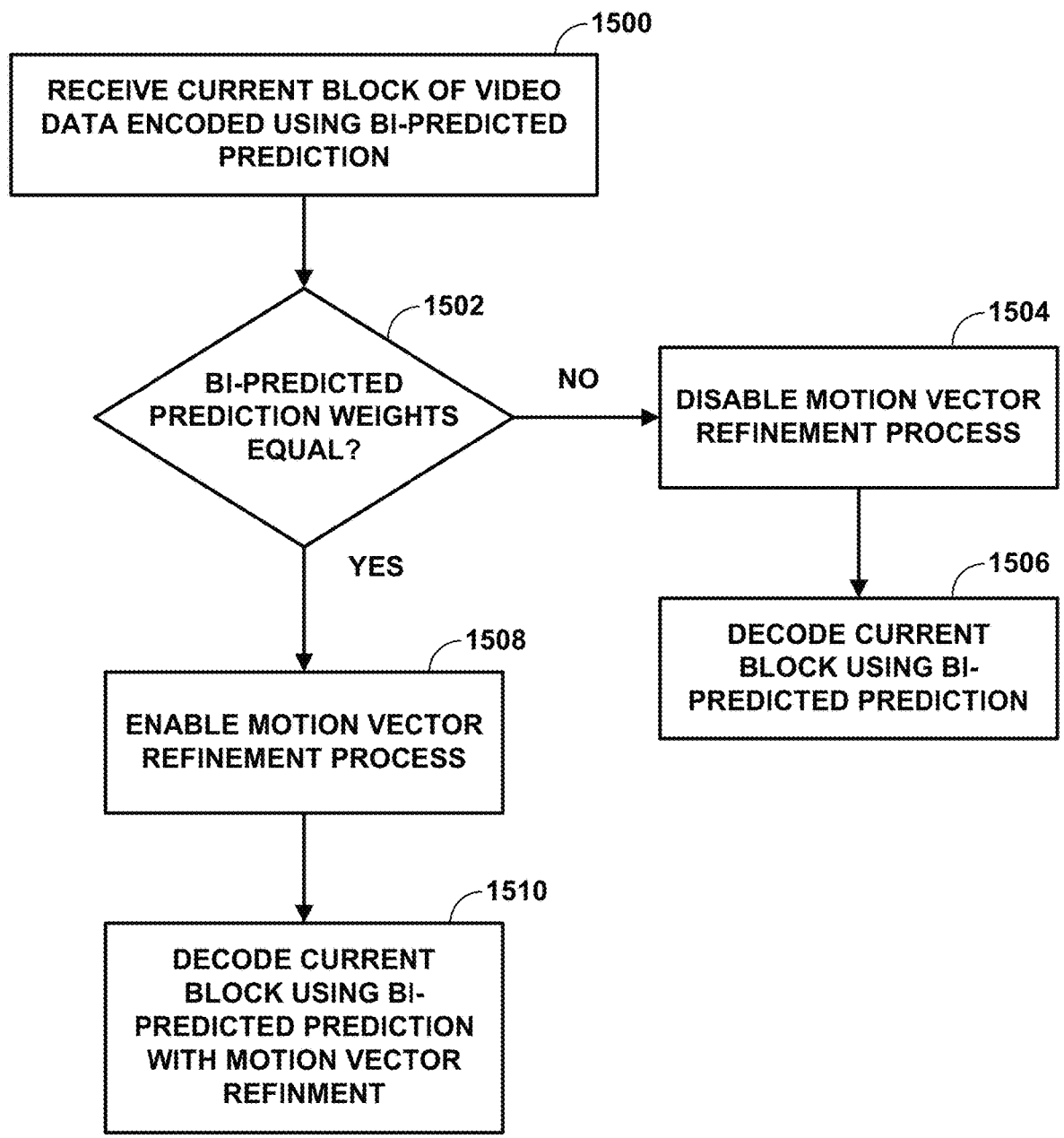
FIG. 14 is a flowchart illustrating an example decoding method for applying decoder-side motion vector refinement.

FIG. 14 is a flowchart illustrating an example decoding method for applying decoder-side motion vector refinement. The techniques of FIG. 14 will be described with reference to video decoder 300, including motion compensation unit 316. However, it should be understood that the techniques of FIG. 14 may also be performed in a reciprocal manner by video encoder 200, including motion compensation unit 224.

In one example of the disclosure, video decoder 300 may be configured to receive a current block of video data encoded using bi-predicted prediction (1500). Video decoder 300 may then determine if the bi-predicted prediction weights are equal (1502). If the bi-predicted prediction weights are not equal, video decoder 300 may disable a motion vector refinement process (1504), and decode the current block using bi-predicted prediction without motion vector refinement (1506). If video decoder 300 determines that the bi-predicted prediction weights are equal, video decoder 300 may enable a motion vector refinement process (1508), and decode the current block using bi-predicted prediction with motion vector refinement (1510).

Accordingly, in view of the above example, video decoder 300 may be configured to determine motion vectors for a current block of video data encoded using bi-predicted prediction, determine to use a motion vector refinement process on the motion vectors based on weights used for the bi-predicted prediction of the current block, and apply the motion vector refinement process on the motion vectors based on the determination to use the motion vector refinement process. In one example, when the weights used for the bi-predicted prediction of the current block are not equal, video decoder 300 may be configured to determine to disable the motion vector refinement process. In one example, the motion vector refinement process is bilateral template matching.

In one example, the bi-prediction prediction is weighted bi-prediction. In another example, the bi-prediction prediction is generalized bi-prediction.

In another example, video decoder 300 may be configured to determine the weights used for the bi-predicted prediction of the current block at a picture level. In another example, video decoder 300 may be configured to determine the weights used for the bi-predicted prediction of the current block at a block level.

Figure 15:
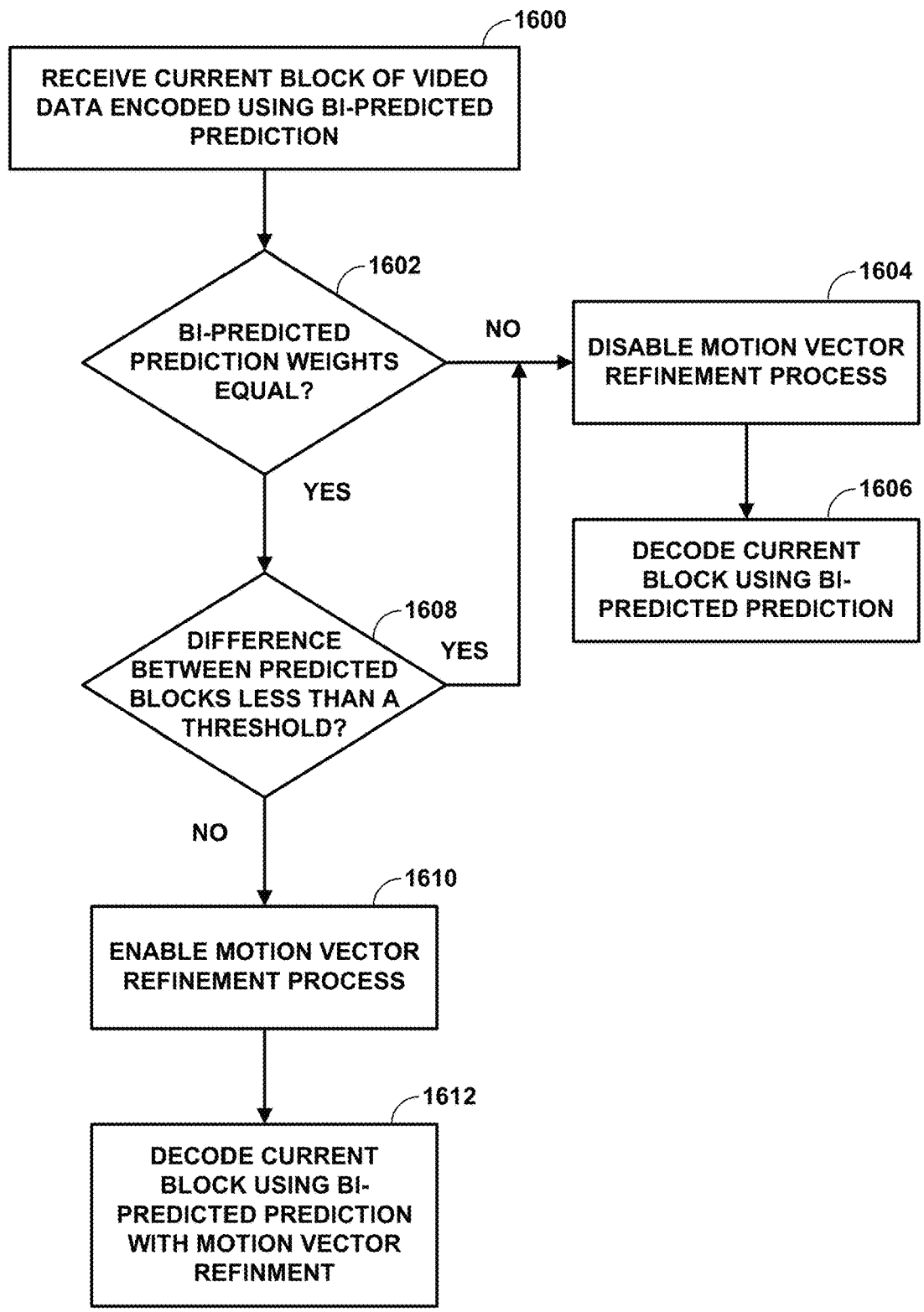
FIG. 15 is a flowchart illustrating another example decoding method for applying decoder-side motion vector refinement.

FIG. 15 is a flowchart illustrating another example decoding method for applying decoder-side motion vector refinement. The techniques of FIG. 15 will be described with reference to video decoder 300, including motion compensation unit 316. However, it should be understood that the techniques of FIG. 15 may also be performed in a reciprocal manner by video encoder 200, including motion compensation unit 224.

In one example of the disclosure, video decoder 300 may be configured to receive a current block of video data encoded using bi-predicted prediction (1600). Video decoder 300 may then determine if the bi-predicted prediction weights are equal (1602). If the bi-predicted prediction weights are not equal, video decoder 300 may disable a motion vector refinement process (1604), and decode the current block using bi-predicted prediction without motion vector refinement (1606).

If video decoder 300 determines that the bi-predicted prediction weights are equal, video decoder 300 may further determine if a difference between predicted blocks identified by motion vectors of the bi-predicted block is less than a threshold (1608). If yes, video decoder 300 may disable a motion vector refinement process (1604), and decode the current block using bi-predicted prediction without motion vector refinement (1606). If no, video decoder 300 may enable a motion vector refinement process (1610), and decode the current block using bi-predicted prediction with motion vector refinement (1612).

Accordingly, in view of the above example, video decoder 300 may be configured to determine motion vectors for a current block of video data encoded using bi-predicted prediction, determine a difference between predicted blocks identified by the motion vectors, determine to use a motion vector refinement process on the motion vectors based on weights used for the bi-predicted prediction of the current block and the determined difference between the predicted blocks identified by the motion vectors, and apply the motion vector refinement process on the motion vectors based on the determination to use the motion vector refinement process.

Illustrative examples of the disclosure include the following:

EXAMPLE 1: A method of coding video data, the method comprising determining a motion vector for a current block of video data, determining to use a motion vector refinement process on the motion vector based on weights used for bi-predicted prediction of the current block, and refining the motion vector based on the determination.

EXAMPLE 2: The method of Example 1, wherein the bi-prediction prediction is weighted bi-prediction.

EXAMPLE 3: The method of Example 1, wherein the bi-prediction prediction is generalized bi-prediction.

EXAMPLE 4: The method of Example 1, wherein determining the motion vector for the current block of video data comprises determining the motion vector using bilateral template matching.

EXAMPLE 5: A method of coding video data, the method comprising determining a motion vector for a current block of video data, determining to use a motion vector refinement process on the motion vector based a difference between two predicted blocks, and refining the motion vector based on the determination.

EXAMPLE 6: A method of coding video data, the method comprising receiving a current block of video data that is to be coded using bilateral template matching, determining two predicted blocks for the current block using bilateral template matching, wherein a first block of the two predicted blocks is determined based on a non-integer motion vector, wherein determining the first block comprises performing a horizontal interpolation based on the non-integer motion vector, storing the output of the horizontal interpolation at a higher bitdepth than an internal bitdepth, and using the output of the horizontal interpolation stored at the higher bitdepth to perform a vertical interpolation.

EXAMPLE 7: The method of any of Examples 1-6, wherein coding comprises decoding.

EXAMPLE 8: The method of any of Examples 1-6, wherein coding comprises encoding.

EXAMPLE 9: A device for coding video data, the device comprising one or more means for performing the method of any of Examples 1-8.

EXAMPLE 10: The device of Example 9, wherein the one or more means comprise one or more processors implemented in circuitry.

EXAMPLE 11: The device of any of Examples 9 and 10, further comprising a memory to store the video data.

EXAMPLE 12: The device of any of Examples 9-11, further comprising a display configured to display decoded video data.

EXAMPLE 13: The device of any of Examples 9-12, wherein the device comprises one or more of a camera, a computer, a mobile device, a broadcast receiver device, or a set-top box.

EXAMPLE 14: The device of any of Examples 9-13, wherein the device comprises a video decoder.

EXAMPLE 15: The device of any of Examples 9-14, wherein the device comprises a video encoder.

EXAMPLE 16: A computer-readable storage medium having stored thereon instructions that, when executed, cause one or more processors to perform the method of any of Examples 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining motion vectors for a current block of video data encoded using bi-predicted prediction;
   determining that weights used for predictors from two reference picture lists for the bi-predicted prediction of the current block are not equal;
   determining to disable a motion vector refinement process for the motion vectors based on determining that the weights used for the predictors from the two reference picture lists for the bi-predicted prediction of the current block are not equal; and
   decoding the current block of video data using the bi-predicted prediction without the motion vector refinement process.

2. The method of claim 1, wherein the bi-prediction prediction is weighted bi-prediction.

3. The method of claim 1, wherein the bi-prediction prediction is generalized bi-prediction.

4. The method of claim 1, further comprising:
   determining the weights used for predictors from two reference picture lists for the bi-predicted prediction of the current block at a picture level.

5. The method of claim 1, further comprising:
   determining the weights used for predictors from two reference picture lists for the bi-predicted prediction of the current block at a block level.

6. The method of claim 1, wherein the motion vector refinement process is bilateral template matching.

7. The method of claim 1, further comprising:
   determining motion vectors for a second block of video data encoded using bi-predicted prediction;
   determining that weights used for predictors from two reference picture lists for the bi-predicted prediction of the second block are equal;
   determining a difference between predicted blocks identified by the motion vectors for the second block;
   determining to apply the motion vector refinement process on the motion vectors for the second block based on the weights used for the predictors from the two reference picture lists for the bi-predicted prediction of the second block and the determined difference between the predicted blocks identified by the motion vectors for the second block.

8. The method of claim 1, determining a difference between predicted blocks identified by the motion vectors, wherein determining to disable the motion vector refinement process on the motion vectors based on the weights used for the predictors from the two reference picture lists for the bi-predicted prediction of the current block is further based on the determined difference between the predicted blocks identified by the motion vectors and further comprises:
   determining to disable the motion vector refinement process in the case that the difference between the predicted blocks identified by the motion vectors is less than a threshold.

9. The method of claim 7, wherein determining the difference between the predicted blocks identified by the motion vectors for the second block comprises:
   determining the difference between the predicted blocks identified by the motion vectors for the second block using a sum of absolute differences between the predicted blocks or a sum of squared error between the predicted blocks.

10. The method of claim 8, further comprising:
    determining the threshold based on a number of samples in the predicted blocks and a bitdepth of the samples in the predicted blocks.

11. The method of claim 7, wherein the motion vector refinement process is bilateral template matching.

12. The method of claim 11, wherein applying the bilateral template matching on the motion vectors for the second block comprises:
    determining two predicted blocks for the second block using the bilateral template matching, wherein a first predicted block of the two predicted blocks is determined based on the motion vectors for the second block, wherein the motion vectors for the second block include a non-integer motion vector, and wherein determining the first predicted block comprises:
      performing a horizontal interpolation based on the non-integer motion vector;
      storing the output of the horizontal interpolation at a higher bitdepth than an internal bitdepth; and
      using the output of the horizontal interpolation stored at the higher bitdepth to perform a vertical interpolation.

13. An apparatus configured to decode video data, the apparatus comprising:
    a memory configured to store a current block of video data; and
    one or more processors implemented in circuitry and in communication with the memory, wherein the one or more processors are configured to:
      determine motion vectors for a current block of video data encoded using bi-predicted prediction;
      determine that weights used for predictors from two reference picture lists for the bi-predicted prediction of the current block are not equal;
      determine to disable a motion vector refinement process for the motion vectors based on the determination that the weights used for the predictors from the two reference picture lists for the bi-predicted prediction of the current block are not equal; and
      decode the current block of video data using the bi-predicted prediction without the motion vector refinement process.

14. The apparatus of claim 13, wherein the bi-prediction prediction is weighted bi-prediction.

15. The apparatus of claim 13, wherein the bi-prediction prediction is generalized bi-prediction.

16. The apparatus of claim 13, wherein the one or more processors are further configured to:
    determine the weights used for predictors from two reference picture lists for the bi-predicted prediction of the current block at a picture level.

17. The apparatus of claim 13, wherein the one or more processors are further configured to:

determine the weights used for predictors from two reference picture lists for the bi-predicted prediction of the current block at a block level.

18. The apparatus of claim 13, wherein the motion vector refinement process is bilateral template matching.

19. The apparatus of claim 13, wherein the one or more processors are further configured to:
  determine motion vectors for a second block of video data encoded using bi-predicted prediction;
  determine that weights used for predictors from two reference picture lists for the bi-predicted prediction of the second block are equal;
  determine a difference between predicted blocks identified by the motion vectors for the second block;
  determine to apply the motion vector refinement process on the motion vectors for the second block based on the weights used for the predictors from the two reference picture lists for the bi-predicted prediction of the second block and the determined difference between the predicted blocks identified by the motion vectors for the second block.

20. The apparatus of claim 13, wherein the one or more processors are further configured to determine a difference between predicted blocks identified by the motion vector, wherein to determine to disable the motion vector refinement process on the motion vectors based on the weights used for the predictors from the two reference picture lists for the bi-predicted prediction of the current block is further based on the determined difference between the predicted blocks identified by the motion vectors, the one or more processors are further configured to:
  determine to disable the motion vector refinement process in the case that the difference between the predicted blocks identified by the motion vectors is less than a threshold.

21. The apparatus of claim 19, wherein to determine the difference between the predicted blocks identified by the motion vectors for the second block, the one or more processors are further configured to:
  determine the difference between the predicted blocks identified by the motion vectors for the second block using a sum of absolute differences between the predicted blocks or a sum of squared error between the predicted blocks.

22. The apparatus of claim 20, wherein the one or more processors are further configured to:
  determine the threshold based on a number of samples in the predicted blocks and a bitdepth of the samples in the predicted blocks.

23. The apparatus of claim 19, wherein the motion vector refinement process is bilateral template matching.

24. The apparatus of claim 23, wherein to apply the bilateral template matching on the motion vectors for the second block, the one or more processors are further configured to:
  determine two predicted blocks for the second block using the bilateral template matching, wherein a first predicted block of the two predicted blocks is determined based on the motion vectors for the second block, wherein the motion vectors for the second block include a non-integer motion vector, and wherein to determine the first predicted block, the one or more processors are further configured to:
    perform a horizontal interpolation based on the non-integer motion vector;
    store the output of the horizontal interpolation at a higher bitdepth than an internal bitdepth; and
    use the output of the horizontal interpolation stored at the higher bitdepth to perform a vertical interpolation.

25. The apparatus of claim 13, wherein the apparatus is a wireless communication device.

26. A non-transitory computer-readable storage medium storing instructions that, when executed, cause one or more processors configured to decode video data to:
  determine motion vectors for a current block of video data encoded using bi-predicted prediction;
  determine that weights used for predictors from two reference picture lists for the bi-predicted prediction of the current block are not equal;
  determine to disable a motion vector refinement process for the motion vectors based on the determination that the weights used for the predictors from the two reference picture lists for the bi-predicted prediction of the current block are not equal; and
  decode the current block of video data using the bi-predicted prediction without the motion vector refinement process.

* * * * *